(12) United States Patent
Naganuma

(10) Patent No.: US 6,456,380 B1
(45) Date of Patent: Sep. 24, 2002

(54) METHOD AND APPARATUS FOR MEASURING WAVEFORM OF OPTICAL SIGNAL

(75) Inventor: Kazunori Naganuma, Tokyo (JP)

(73) Assignee: Nippon Telegraph and Telephone Corporation (JP)

(*) Notice: Subject to any disclaimer, the term of this patent is extended or adjusted under 35 U.S.C. 154(b) by 0 days.

(21) Appl. No.: 09/570,889

(22) Filed: May 15, 2000

(30) Foreign Application Priority Data

May 19, 1999 (JP) ............................................. 11-139087
Sep. 14, 1999 (JP) ............................................. 11-260816

(51) Int. Cl.$^7$ ................................................. G01B 9/02
(52) U.S. Cl. ....................................................... 356/450
(58) Field of Search ................................ 356/450, 451, 356/484, 491

(56) References Cited

U.S. PATENT DOCUMENTS

| 4,792,230 A | | 12/1988 | Naganuma et al. | |
|---|---|---|---|---|
| 5,936,732 A | * | 8/1999 | Smirl et al. | ................ 356/491 |
| 6,266,145 B1 | * | 7/2001 | Lee et al. | ................... 356/450 |

FOREIGN PATENT DOCUMENTS

| JP | 6121100 | 9/1986 |
|---|---|---|
| JP | 10092981 | 4/1998 |

OTHER PUBLICATIONS

R. Trebino et al. "Measuring ultrashort laser pulses in the time–frequency domain using frequency–resolved optical gating", Review of scientific Instrument, vol. 68 91997), pp. 3277–3295.

V. Wong et al. "Analysis of ultrashort pulse–shape measurement using linear interferometers", Optics Letters, vol. 19 (1994), pp. 287–289.

J. Debeau et al. "Simple method for the complete characterization of an optical pulse", Optics Letters, vol. 23 (1998), pp. 1784–1786.

C. Iaconis et al. "Spectral phase interferometry for direct electric–field reconstruction of ultrashort optical pulses", Optics Letters, vol. 23 (1998), pp. 792–794.

Y. Ishigame et al. "LiNbO$_3$ waveguide second–harmonic––generation device phase matched with a fan–out domain inverter grating", Optics Letters, vol. 16 (1991), pp. 375–377.

p. 1228, left column, Research paper of IEE Journal of Quantum Electronics, vol. 25 (1989), pp. 1225–1233.

Ian A. Walmsley "Measuring Ultrafast Optical Pulses Using Spectral Interferometry", Optics & Photonics News, Apr. 1999, pp. 29–33.

* cited by examiner

Primary Examiner—Samuel A. Turner
(74) Attorney, Agent, or Firm—Ostrolenk, Faber, Gerb & Soffen, LLP

(57) ABSTRACT

A method for measuring a temporal waveform of the electric field of an optical signal avoids substantial sacrifice of sensitivity and enables accurate measuring of the ultra-fast temporal waveform of the electric field of the optical signal. It generates phase conjugated light by applying light whose phase is fixed with respect to optical signal to be measured; obtains spectral phase by observing mixed spectrum generated by combining the optical signal to be measured with the phase conjugated light; and obtains the temporal waveform of the electric field of the optical signal by attaching the spectral phase to a separately observed spectrum of the optical signal to be measured.

64 Claims, 13 Drawing Sheets

METHOD AND APPARATUS FOR MEASURING WAVEFORM OF OPTICAL SIGNAL

This application is based on Japanese Patent Application Nos. 11-139087 (1999) filed May 19, 1999 and 11-260816 (1999) filed Sep. 14, 1999, the contents of which are incorporated hereinto by reference.

BACKGROUND OF THE INVENTION

1. Field of the Invention

The present invention relates to a method and apparatus for measuring a temporal waveform of the electric field of an optical signal, and particularly to a technique for accurately measuring temporal variations in intensity and phase of ultra-fast optical signals whose temporal waveforms cannot be measured with an ordinary means because of their much faster changes than the response time of existing high-speed optical detectors or electronic circuits. Generally, a simultaneous measuring of the intensity and phase enables full determination of the characteristics of an optical signal as a classical electromagnetic wave. Therefore, such types of measuring methods are referred to as a method for measuring a temporal waveform of the electric field of an optical signal.

2. Description of the Related Art

Ultra-fast optical signals in a picosecond to femtosecond order, which have no suitable optical detector with a sufficient time resolution, have been observed by correlators in the recent twenty years. Such correlators make an optical signal to be measured and a reference optical pulse incident and focused onto a nonlinear medium, and measure the integrated power of the generated light in terms of a function of a time relationship (delay time) between the optical signal to be measured and the reference optical pulse. In this case, the time resolution is determined only by the response time of the nonlinear medium and the width of the reference optical pulse, completely independently of the response time of an optical detector or the like for carrying out optic-electrical conversion of the generated light. Using the optical signal to be measured itself as the reference optical signal provides a simplest and versatile measuring method. The signal obtained in this measurement is called an autocorrelation signal, and the apparatus for measuring it is called an autocorrelator.

It was once considered difficult to obtain the waveform of the optical signal to be measured from the autocorrelation signal without imposing any conditions.

At the present, however, it is known that by complementing the data by the spectrum of the optical signal to be measured, an iterative calculation enables the simultaneous calculation of the intensity and phase of the optical signal to be measured. Such a method is disclosed in Japanese Patent Application Publication No. 5-2252 (1993) (Japanese Patent Application No. 61-211100 (1986) "Method for measuring and estimating ultrashort optical pulses" by Kazunori Naganuma and Juichi Noda, or U.S. Pat. No. 4,792,230 "Method and apparatus for measuring ultrashort optical pulse", by Kazunori Naganuma and Juichi Noda.

Another analogous methods are carried out which observe a spectrum of light generated in an nonlinear medium, and calculate the intensity and phase of an optical signal to be measured by performing iterative calculation using two-dimensional data of two variables, the spectrum component of the generated light and the time delay. For example, such a method is described in detail in R. Trebino, K. W. Delong, D. N. Fittinghoff, J. N. Sweetser. M. A. Krumbuegel and B. A. Richman "Measuring ultrashort laser pulses in the time-frequency domain using frequency-resolved optical gating", Review of Scientific Instrument, Vol. 68 (1997), pp. 3277–3295.

However, such methods for measuring waveforms of optical signals have an ineradicable drawback in that they cannot deal with optical signals with complicated waveforms, and hence cannot fulfill the needs of the measurement in the recent optical information processing field. For example, as a simplest example of an optical signal waveform that those methods cannot deal with, is known a pair of pulses with different phases.

Furthermore, since the iterative calculation is nonlinear, it is very difficult to estimate the effect. of noise or error in the data used for the calculation on the calculation results. In a worst case, the calculation falls into a chaotic behavior so that a slightest variation in the input can result in an entirely different output. None of the foregoing iterative calculations are guaranteed that such behavior does not take place. Thus, the quality and accuracy of measuring apparatuses based on such methods cannot be warranted because of the intrinsic ambiguity of the iterative calculation.

Let us consider here the reason why the measurement of the temporal waveform of the electric field of an optical signal requires the iterative calculation. It is well known that Fourier transform can bring any temporal waveform into one-to-one correspondence with a spectrum in a frequency domain. In other words, once a spectrum of a signal is known, its temporal waveform can be obtained by inverse Fourier transform. As for the electric field of optical signals, their power spectra are usually measured using a common optical spectrum observing method, and hence it is not difficult to obtain the magnitudes (amplitudes) of the spectra of the optical signals. However, without acquiring the phases of the spectra, the corresponding temporal waveforms cannot be obtained from the spectra using the inverse Fourier transform. Here, with the optical signals, there are circumstances that the measurement of the spectral phases is not obvious at all.

Such circumstances that although the magnitude of some physical quantity is known, its phase is difficult to obtain are often encountered in various scientific fields. Thus, to mathematically handle the circumstances, there has been established a distinct academic branch called phase retrieval problem. The foregoing iterative calculation is considered as an application of a method for a phase retrieval problem to the measurement of optical signals.

Direct observations of the spectral phase will enable temporal waveforms of electric field of optical signals to be obtained without using the iterative calculation involving the complicated phase retrieval problem. Recently, such a direct measuring method of the spectral phase has attracted attention, and some proposals have been made that can be called frequency shearing interferometer.

A classical interferometer detects in a direct current (DC) manner an interference signal that is obtained by splitting an optical signal into two waves, and by recombining and interfering them again. In this case, the spectral components of the same frequency are superimposed so that those frequencies are mutually nullified, and thus the DC component is generated. However, since the phases of the spectral components are completely canceled out at the same time, the spectral phases can never be observed. Even if a fast optical detector of today is used to observe the interference signal, because it cannot follow the ultra-fast optical signal in a picosecond to femtosecond order to be observed here, it cannot exceed the realm of the DC observation, providing only the same result.

In view of this, a frequency shearing interferometer is proposed that splits an optical signal into two portions, shifts the frequency of one of them, and recombines them to interfere with each. other. Assuming the shift amount to be $\Delta v$, the spectral components with the frequency shift $\Delta v$ superimpose on each other to cancel out the frequency components, thereby generating a DC component. The magnitude of the DC component depends on the phase difference between the spectral components with the frequency shift $\Delta v$. This enables the spectral phase to be directly observed in terms of the difference using $\Delta v$ as a step. The principle of such a frequency shearing interferometer is disclosed in V. Wong and I. A. Walmsley "Analysis of ultrashort pulse-shape measurement using linear interferometers", Optics Letters, Vol. 19 (1994), pp. 287–289.

If the shift amount $\Delta v$ is too small, the phase difference also becomes too small and is buried in noise, producing no significant result. Accordingly, a particular means for shifting the frequency determines the feasibility of the frequency shearing interferometer.

Using a phase modulator as the frequency shifter will be most easily conceived. The example is disclosed in J. Debuau, B. Kowalski and R. Boittin, "Simple method for the complete characterization of an optical pulse", Optics Letters, Vol. 23 (1998), pp. 1784–1786. However, the frequency shift amount $\Delta v$ provided by such a method is at most the driving frequency of a modulator or twice that.

Considering the performance of current modulators, it is completely insufficient to apply them to ultra-fast optical signals in the picosecond to femtosecond order the present invention is planing to handle. Furthermore, if the frequency shift amount $\Delta v$ provided by existing electronic circuits can meet the shift amount required, this means that the optical signal is sufficiently slow so that its waveform can be directly observed without much difficulty using an ordinary means combining an existing fast optical detector with a high-speed electronic circuit. In short, using the electrical phase modulator as the frequency shifter has little practical importance.

Recently, a more innovative method that can obtain the frequency shift amount $\Delta v$ in an optical frequency domain is disclosed by C. Iaconis and I. A. Walmsley, "Spectral phase interferometry for direct electric-field reconstruction of ultrashort optical pulses", Optics Letters, Vol. 23 (1998), pp. 792–794. It can implement a sufficient frequency shift amount even for an ultra-fast optical signal in the picosecond to femtosecond order. FIG. 13A is a schematic diagram showing a setup for implementing a conventional method for measuring a temporal waveform of the electric field of an optical signal.

In this example, an optical signal to be measured 501 is split into two portions by a beam splitter 502. One of them transmitted through a dispersive optics 516 reflects off a reflector 508, and reaches a beam combiner 511. The other of them transmitted through an optical signal pair generating optics, which consists of a half mirror 517 and a pair of reflectors 518 and 519, reaches the beam combiner 511. The two optical signals reaching the beam combiner 511 are combined, and incident and focused on a sum-frequency generation (SFG) crystal 520.

The power spectrum of the light emitted from the SFG crystal 520 is observed by an optical spectrum observation instrument 515.

The operation of the conventional system will now be outlined with reference to FIG. 13B, a schematic view of the temporal behavior of optical signals incident onto the SFG crystal 520. For the purpose of simplicity, it illustrates a case in which a simple optical pulse is supplied as the optical signal to be measured 501. First, the light transmitted through the optical signal pair generating optics and emitted from the half mirror 517 appears in the form of a pair of pulses with maintaining its original pulse width.

Assume that the time interval between the pair of pulses is $\tau$. The time interval $\tau$ can be determined by providing a difference between the optical path length from the half mirror 517 to the reflector 518 and the optical path length from the half mirror 517 to the reflector 519, and by adjusting the difference. On the other hand, the light transmitted through the dispersive optics 516 is broadened in the pulse width and varied in its instantaneous frequency with time, thus forming a pulse with chirping.

The SFG crystal 520 generally generates a sum frequency $v_1+v_2$ for the two optical signals with frequencies $v_1$ and $v_2$. Assuming that the power spectrum of the optical signal to be measured 501 is $S(v)$, the SFG crystal 520 outputs the optical signals having power spectra $S(v-v_p)$ and $S(v-v'_p)$, the power spectra translated on the frequency axis respectively corresponding to the pulse pair emitted from the half mirror as shown in FIG. 13B, where the shift amounts $v_p$ and $v'_p$ are the instantaneous frequencies of the portions that each of the pulse pair emitted from the half mirror overlaps with the pulse emitted from the dispersive optics.

The difference between the instantaneous frequencies is expressed by $$v'_p - v_p = (2\pi D)^{-1}\tau \qquad (1)$$

where D is the second-order dispersion of the dispersive optics 516, and $\tau$ is the time interval between the pulse pair emitted from the half mirror. The frequency difference operates as the frequency shift amount $\Delta v$ in the conventional frequency shearing interferometer. For example, when selecting D=0.01 ps$^2$ and $\tau$=0.1 ps, $\Delta v$ becomes 1.6 THz, constituting a sufficient shift amount for an optical signal in a femtosecond order.

Thus, the conventional system enables the spectral phase difference to be directly observed for the optical signal input to be measured from a picosecond to femtosecond region. Subsequent calculation of the running sum of the differences gives the spectral phase. Finally, the electric field of the optical signal can be calculated by attaching the spectral phase to the magnitude of the spectrum of the optical signal obtained from the power spectrum measured by another method, and by carrying out the inverse Fourier transform thereof. Thus, the conventional system can measure the temporal waveform of the electric field of the ultrashort optical signal without using the iteration calculation.

However, the conventional measuring method of the temporal waveform of the electric field of the optical signal described above present the following problems.

Generally speaking, there are two factors that determine the response time of a nonlinear medium (the sum-frequency generation crystal, in the conventional system).

The first factor is the response of the nonlinear polarization following to the variations in the electric field of the optical signal incident and focused on the nonlinear medium. In a non-resonant nonlinear effect without involving a real transition, the response of the nonlinear polarization corresponds to the orbiting time of electrons around a nucleus, that is, approximately 1–2 fs, in which case, this factor can be considered to exhibit an instantaneous response in practice. In contrast with this, in the nonresonant nonlinear effect involving the real transition, it is difficult to obtain sufficient responsivity for measuring the ultra-fast optical signal in the picosecond to femtosecond order because of a limitation imposed by the response time of the medium. Therefore, the temporal waveform measuring apparatus including classical autocorrelators usually employ a The second factor relates to a phase matching. For nonlinear polarizations, which will take place in various portions in a finite length medium, to contribute to the electric field of output light in phase, it is necessary for the phases of the nonlinear polarizations to be in phase with the propagation phase of the output light. Since the phases of the nonlinear polarizations occurring in various portions are determined by the propagation phase of the input light, the condition can be reduced to the relationship between the propagation phase of the input light and that of the output light. For example, when obtaining the output light with the sum frequency $v_3$ ($v_3=v_1+v_2$)from two input light waves with the frequencies $v_1$ and $v_2$ by a sum-frequency generating crystal, the contributions of the nonlinear polarizations in various portions of the medium add up each other when the phase mismatch $vk$ given by the following expression is zero, resulting in the maximum output light.

$$vk = k_1 + k_2 - k_3 \quad (2)$$

where $k_i$ are wave numbers of the light waves, which are expressed by $k_i = n_i \omega_i/c$, where $n_i$ are the refractive indices and c is the speed of light in vacuum. Using equation (2), it is found that in order to make the phase mismatch zero, that is, to establish phase matching, all three refractive indices are equal, or the refractive index associated with the maximum frequency lies in between the remaining two refractive indices.

In a wavelength region in which the medium is transparent, since the refractive index monotonically increases with the frequency, the phase matching can never be established as long as considering only a single refractive index.

An anisotropic optical medium exhibits birefringence that the refractive index varies along the direction of the electric field of light.

Applying this phenomenon makes the phase matching possible which is called angular phase matching. The refractive indices $n_s$ exhibited by light transmitted in the direction s (vector quantity) in a birefringence optical crystal with a principal refractive index ($n_x$, $n_y$, $n_z$) can be obtained by solving the following Fresnel's velocity formula.

$$\frac{S_x^2}{n_s^{-2} - n_x^{-2}} + \frac{S_y^2}{n_s^{-2} - n_y^{-2}} + \frac{S_z^2}{n_s^{-2} - n_z^{-2}} = 0 \quad (3)$$

Generally, two refractive indices are obtained for each propagation direction. The two different refractive indices correspond to linear polarizations orthogonal to each other. To establish phase matching, it is necessary for the light wave with the maximum frequency among the three waves to be propagated with the polarization giving the low refractive index, and for one of the two remaining light waves to be propagated with the polarization giving the high refractive index. For the remaining light wave we can choose the high or low refractive index, which is called type 1 or type 2 phase matching. After selecting the combination of the polarizations of the light waves, the common propagation direction s (vector quantity) that makes zero the phase mismatch in equation (3) is searched for.

On the other hand, a quasi phase matching technique has attracted attention recently that artificially constructs a structure in which the nonlinear coefficient varies periodically, and tries to achieve the phase matching using the periodicity. The quasi phase matching can utilize, even in a nonlinear crystal like lithium niobate having been conventionally used, a larger component such as $d_{zzz}$ in the nonlinear coefficient tensor, which is unusable in the foregoing angular phase matching. The technique is expected to implement a higher efficient nonlinear effect, or to enable the phase matching in a wavelength region in which the angular phase matching cannot be established. Furthermore, since the polarization of the input and output light waves can be set along the principal axis of a crystal, problems generally accompanying the angular phase matching can be avoided in that the birefringence limits the interaction length and degrades the shape of the output light beam. Moreover, as for materials inapplicable to the angular phase matching, such as semiconductor or glass, the quasi phase matching opens up new possibility for establishing the phase matching with them.

To achieve the quasi phase matching, although it is ideal that the nonlinear coefficients vary sinusoidally, because of the difficulty of implementing such variations in practice, a stepwise variation in the nonlinear coefficients is used. The implementation method of the variation in the nonlinear coefficients depends on materials. For example, in a ferroelectric crystal such as lithium niobate, the structure is constructed in which the sign of the nonlinear coefficient is changed periodically by reversing the polarization by applying external electric field. As for semiconductor materials, the structure is also built in which the sign of the nonlinear coefficient is changed periodically by bonding or by epitaxial growth on a substrate with its surface state varying periodically. In glass or organic materials, the sections are intermingled in which the nonlinear coefficient is nonzero and zero using periodic thermal polarization or periodic etching process. The effective nonlinear coefficient $d_{eff}$ involving the stepwise nonlinear coefficient variation is usually given by the following equation.

$$d_{eff} = (d_s/\pi) \sin(\pi R) \quad (4)$$

where $d_s$ is the peak-to-peak amplitude of the nonlinear coefficient, which equals 2d when the nonlinear coefficient swings between d and –d because of the sign inversion, and equals d when it swings between d and zero, and where R is a ratio at which a high nonlinear coefficient portion occupies in one period. When the high and low portions of the nonlinear coefficient are repeated at 1:1, the ratio R is 1/2, offering the maximum effective nonlinear coefficient.

The variation period $\Lambda$ of the nonlinear coefficient required for the quasi phase matching is obtained from the condition that cancels out the phase mismatch of the foregoing equation (2) by the wave number corresponding to the period, and is given by the following expression.

$$\Lambda = 2\pi/|k_1 + k_2 - k_3| \quad (5)$$

Once the variation period thus selected has been constructed, the frequencies $v_1$, $v_2$ and $v_3$, at which the phase matching is established in the nonlinear medium, are fixed. This is undesirable for the application to an instrument such as a temporal waveform measuring apparatus requiring tuning of the phase matching frequencies to the frequency of the input optical signal. This problem, however, has been solved recently by the following methods: a method of using a nonlinear medium to which fan-out poling is imposed so that the period varies in the direction perpendicular to the optical path; and a method of carrying out tuning by propagating the light in the direction having an angle with the wave number direction of the periodical structure in the nonlinear medium, and by varying the incident direction of the light to the medium.

These phase matching tuning methods are respectively disclosed by Y. Ishigame, T. Suhara and N. Nishihara, "LiNbO$_3$ waveguide second-harmonic-generation device phase matched with a fan-out domain inverted grating," Optics-Letters, Vol. 16 (1991), pp. 375–377, and Japanese Patent Application Laid-open No. 10-92981 (1998), "Wavelength variable quasi phase matching device" by Kazunori Naganuma, Shigeo Ishibashi, Hidetoshi Iwamura and Hirohisa Kanbara.

When the phase matching is achieved by placing the foregoing phase mismatch to zero, a bandwidth around the phase matched frequency to be considered. In the plane-wave approximation, the dependence of the power conversion efficiency to the output light on the phase mismatch $\Delta k$ and medium length L is given by the following expression.

$$\eta L^2 \text{sinc}^2 (\Delta k L/2) \qquad (6)$$

where the function sinc(x) represents (sin x)/x in equation (6). The value $\Delta k L/2$ providing the first zero of the output light intensity is equal to $\pi$. The phase mismatch $\Delta k$ at this point is translated to the bandwidth BW (full width) of the input light by the following equation for the second harmonic generation (SHG) on which the classical autocorrelator is based;

$$BW=((\tau_3-\tau_1)L)^{-1} \qquad (7)$$

and for the sum frequency generation (SFG) on which the conventional system is based.

$$BW=2((\tau_3-\tau_1)L)^{-1} \qquad (8)$$

where $\tau_1$ and $\tau_3$ are group delays per unit length of the medium for the input light and output light. Therefore, $(\tau_3-\tau_1)L$ in equations (7) and (8) represents the difference between the group delays of the input light and output light proceeding through the crystal, and hence can be called group delay mismatch. The reciprocals of the bandwidths indicate the response time of the nonlinear medium for the incident light.

As the medium length L decreases, the response time reduces. This means from different point of view that the bandwidth in terms of the input light conversion increases at the same time. However, as the medium length reduces, the conversion efficiency rapidly decreases in proportion to the square of the medium length, resulting in the reduction in the measurement sensitivity.

More rigorously, the square dependence strictly holds when the beam propagates in the medium with its diameter maintained, that is, when the medium has a channel waveguide structure. When propagating in the bulk medium, adjusting the beam diameter to an optimum value proportional to the square root of the medium length ($L^{1/2}$) can alleviate the dependence of the conversion efficiency on the medium length to its first power (L). However, to measure an optical signal faster than a picosecond, both the conventional method and the classical autocorrelator method previous thereto require the medium length less than 1 mm. Hence, to focus the beam down to a smaller diameter in accordance with the medium length L less than that is not practical hence not carried out.

As described above, the non-resonant nonlinear effect, which the apparatus for measuring temporal waveform is based on, is much smaller than the resonant effect. Therefore, it is desirable that the conversion efficiency be increased as much as possible by increasing the medium length. The increase in the medium length, however, degrades the response time at the same time. Thus, there is usually a tradeoff between the sensitivity and the response time.

This will be described in more detail. First, the classical autocorrelator observes the second harmonic (SH) light generated in the nonlinear medium without spectral decomposition. Disregarding the bandwidth of the nonlinear medium, it is known that the observed signal is proportional to $P_p \cdot P_{av}$, where $P_p$ and $P_{av}$ are peak power and average power of the optical signal to be measured. Considering that the acceptable medium length is limited in proportion to the time width $t_p$ of the optical signal because of the effect of the bandwidth, the observed signal S accords with the following expression.

$$S \, t_p^2 P_p \cdot P_{av} \qquad (9)$$

In the conventional frequency shearing interferometer, the peak powers of the light waves with the frequencies $\nu_p$ and $\nu'_p$ are proportional to $(\Delta_p t_p)^2 P_p$, and it substitutes for the $P_p$ of the above expression (9), where $\Delta_p$ is the line width of the light waves. Accordingly, when disregarding the bandwidth of the nonlinear medium, the observed signal is proportional to $(\Delta_0 t_p)(\Delta_p t_p)^2 P_p P_{av}$, where the factor $\Delta_0 t_p$ reflects the fact that the generated sum frequency (SF) is observed after spectrally decomposed, and $\Delta_0$ is the resolution of the spectrum observation instrument. The $\Delta_p$ or $\Delta_0$ can be broadened as the width of the optical signal reduces.

Thus, the factors $\Delta_0 t_p$ and $\Delta_p t_p$ can be about 0.1 independently of $t_p$, and the reduction of about $10^3$ in the sensitivity due to them is acceptable at the cost of the direct measurement of the spectral phase. Taking account of the restriction imposed on the medium length because of the bandwidth effect, the observed signal accords with the following expression (10).

$$S \, (\Delta_0 t_p)(\Delta_p t_p)^2 t_p^2 \, P_p \cdot P_{av} \qquad (10)$$

As expressed by the foregoing expressions (9) and (10), both the conventional system and the classical autocorrelator reduce their sensitivity in accordance with the square of the temporal resolution to be achieved.

Even if such sensitivity reduction is accepted, another practical problem arises accompanying the increase in the temporal resolution. The problem is that the medium length L required becomes very thin. For example, in an angular matching lithium niobate crystal, the bandwidth given by the foregoing expression (7) equals (158 fs) $^{-1}$ per 1 mm of the crystal length for the SHG from 1.55 µm. To obtain the resolution of 10 fs, a very thin crystal plate of 63 µm thickness is required. It is not easy to fabricate and polish such a thin crystal plate. Furthermore, with a more efficient quasi phase matching lithium niobate crystal, the bandwidth become narrower, (299 fs)$^{-1}$ per 1 mm of the crystal length. In this case, the 10 fs resolution requires a 33 µm thick crystal plate, which is very difficult to fabricate. In the SFG on which the conventional system is based, only twice the bandwidth of the SHG is obtained as seen from equation (8), which presents no ultimate solution to the problems.

Consider measuring an optical signal actually varying at a rate of 10 fs using a measuring apparatus with a nominal resolution (response time) of 10 fs described above. In this case, it is unavoidable for the classical autocorrelator to suffer an error in the measurement. In the case of the conventional frequency shearing interferometer, since the intensity of the signal becomes weak in the wings of the power spectrum translated along the frequency axis, it is difficult to measure the phase in such wings. On the other hand, currently available ultra-short pulse sources can generate pulses with a width as narrow as 10 fs or less. Thus, it is obvious that both the classical autocorrelator and the conventional frequency shearing interferometer cannot meet the requirements of the current high-speed optical signal generation and control technologies.

As described above, the conventional methods for measuring waveforms of electric field of an optical signal have the following problems:

(1) Trying to increase the temporal resolution results in the reduction in the sensitivity in proportion to the square of the resolution; and
(2) The temporal resolution currently required cannot be realized in the first place because it needs a nonlinear medium with a length impractically thin.

SUMMARY OF THE INVENTION

It is therefore an object of the present invention to provide a technique capable of measuring temporal waveforms of the electric field of a ultra-fast optical signal accurately without substantially sacrificing the sensitivity and without carrying out the iterative calculation.

The foregoing and other objects and novel features of the present invention will become apparent from the following description given in connection with the accompanying drawings.

Outlines of the typical aspects of the present invention disclosed herein will be briefly explained.

(1) According to a first aspect of the present invention, there is provided a method for measuring a temporal waveform of the electric field of an optical signal comprising the steps of: generating phase conjugated light by applying local oscillator light to optical signal to be measured; generating mixed light by combining the optical signal to be measured with the phase conjugated light; obtaining a spectral phase by observing a spectrum of the mixed light; and obtaining a temporal waveform of the electric field of the optical signal to be measured by attaching the spectral phase to a separately observed spectrum of the optical signal to be measured.

(2) The method may further comprise the step of acquiring spectra of two mixed light waves which are associated with the local oscillator light having different wavelengths.

(3) The method may further comprise the step of carrying out for each spectrum of the mixed light waves multiple times of measurements with different fixed relative phases between the local oscillator light and the optical signal to be measured.

(4) The method may further comprise the step of comparing, for each wavelength of the local oscillator light, intensity changes in at least two spectral components in the mixed light resulting from changes in a relative phase between the local oscillator light and the optical signal to be measured, and the step of measuring a relative phase between the at least two spectral components using results of the step of comparing.

(5) The step of comparing intensity changes in at least two spectral components resulting from the changes in the relative phase may comprise the steps of: changing the relative phase in a ramp (linear slope) fashion; generating, for sinusoidal intensity changes obtained, a signal whose phase is shifted by 90 degrees from a spectral component adopted as a reference; integrating a product of the intensity changes of the spectral component and intensity changes in another spectral component to obtain a first integral; integrating a product of the intensity changes of the spectral component and the signal whose phase is shifted by 90 degrees to obtain a second integral; and obtaining the relative phase between the spectral components from a ratio of the two integrals.

(6) The integration interval of the integration is set at an integer multiple of a period of the intensity changes in the spectral component adopted as the reference.

(7) The method may further comprise the steps of: splitting the optical signal to be measured; generating the local oscillator light by launching first optical signal to be measured onto a medium with a second-order optical nonlinear effect, the first optical signal to be measured being a first portion split; and generating the phase conjugated light by launching the generated local oscillator light and second optical signal to be measured onto another medium with a second-order optical nonlinear effect, the second optical signal to be measured being a second portion split.

(8) The method may further comprise the step of limiting a spectral width of the local oscillator light by inserting an optical filter in at least one of two positions before and after the medium with the second-order optical nonlinear effect to which the first optical signal to be measured is incident.

(9) The method may further comprise the step of amplifying the light to be incident to the medium with the second-order optical nonlinear effect to which the first optical signal to be measured is incident, or amplifying, when the optical filter is interposed, the light which is output from the optical filter and is to be incident to the medium.

(10) The method may further comprise the steps of:
generating the local oscillator light by launching first optical signal to be measured onto an optical filter; and
generating the phase conjugated light by launching the generated local oscillator light and second optical signal to be measured onto a medium with a third-order optical nonlinear effect.

(11) The method may further comprise the step of amplifying the local oscillator light.

(12) According to a second aspect of the present invention, there is provided an apparatus for measuring a temporal waveform of the electric field of an optical signal comprising: local oscillator light generating means for generating local oscillator light from optical signal to be measured; phase conjugated light generating means for generating phase conjugated light using the local oscillator light; means for obtaining a spectral phase by observing a spectrum of mixed light generated by combining the optical signal to be measured with the phase conjugated light; and means for obtaining a temporal waveform of the electric field of the optical signal to be measured by attaching the spectral phase to a separately observed spectrum of the optical signal to be measured.

(13) The apparatus may further comprise means for acquiring spectra of two mixed light waves which are associated with the local oscillator light having different wavelengths.

(14) The apparatus may further comprise means for carrying out for each spectrum of the mixed light waves multiple times of measurements with different relative phases between the local oscillator light and the optical signal to be measured.

(15) The apparatus may further comprise: means for simultaneously observing intensities of at least two spectral components in the mixed light; means for changing a relative phase between the local oscillator light and the optical signal to be measured; and means for measuring a relative phase between the at least two spectral components by comparing intensity changes in the at least two spectral components resulting from the changes in the relative phase.

(16) The means for simultaneously observing intensities of at least two spectral components may comprise two monochromators, a photo-detector mounted on each of the monochromators, and a beam splitter for splitting the mixed light into two portions to be supplied to the two monochromators.

(17) The means for simultaneously observing intensities of at least two spectral components may comprise a spectrograph equipped with a linear detector array.

(18) The apparatus may further comprise a beam splitter for splitting the optical signal to be measured, wherein the local oscillator light generating means may generate the local oscillator light by launching first optical signal to be measured onto a medium with a second-order optical nonlinear effect, the first optical signal to be measured being a first portion split by the beam splitter, and wherein the phase conjugated light generating means may generate the phase conjugated light by launching the local oscillator light generated by the local oscillator light generating means and second optical signal to be measured onto another medium with a second-order optical nonlinear effect, the second optical signal to be measured being a second portion split by the beam splitter.

(19) The apparatus may further comprise an optical filter inserted in at least one of two positions before and after the medium with the second-order optical nonlinear effect to which the first optical signal to be measured is incident, the optical filter being disposed for limiting a spectral width of the local oscillator light.

(20) The apparatus may further comprise an optical amplifier inserted before the medium with the second-order optical nonlinear effect to which the first optical signal to be measured is incident, or between the optical filter and the medium when the optical filter is inserted.

(21) The local oscillator light generating means may generate the local oscillator light by launching first optical signal to be measured onto an optical filter, and the phase conjugated light generating means may generate the phase conjugated light by launching the local oscillator light generated by the local oscillator light generating means and second optical signal to be measured onto a medium with a third-order optical nonlinear effect.

(22) The apparatus may further comprise an optical amplifier for amplifying the local oscillator light.

Thus, the essence of the present invention is summarized to the following steps: generating phase conjugated light under the action of the local oscillator light on the optical signal to be measured; observing the mixed spectrum generated as a result of combining the optical signal to be measured with the phase conjugated light; obtaining the spectral phase from the mixed spectrum; and obtaining the temporal waveforms of the electric field of the optical signal to be measured by attaching the spectral phase to the separately measured spectrum of the optical signal to be measured.

Here, since the spectral phase is obtained in the symmetrized manner with respect to the degenerate frequency, where the phase conjugated light has the same frequency as its original light, it is preferable for recovering the general spectral phase to acquire two mixed spectra with changing the wavelength or frequency of the local oscillator light.

It is also preferable for accurately detecting the spectral phase when it is small to acquire the mixed spectra multiple times with changing the fixed relative phase between the local oscillator light and the light to be measured. Alternatively, to accurately detect the very small spectral phase, a configuration can be implemented in which intensities of at least two spectral components in the mixed spectrum are observed simultaneously, and the means for changing the relative phase is provided so that the relative phase can be measured by comparing the changes in the intensities of the at least two spectral components following the changes in the relative phase.

As a method for obtaining the local oscillator light, the light to be measured can be split into two portions, followed by launching one of the portions onto the medium with the second-order optical nonlinear effect to generate second harmonic light to be used as the local oscillator light. In this case, the local oscillator light and the remaining portion of the light to be measured that is split are incident onto another medium with the second-order optical nonlinear effect to generate the phase conjugated light.

The optical filter can be interposed before and/or after the first medium with the second-order optical nonlinear effect to limit the spectral bandwidth of the local oscillator light.

Furthermore, the optical amplifier can be interposed before the first medium with the optical nonlinear effect to enhance the intensity of the local oscillator light. When the optical filter is inserted before the first medium with the second-order optical nonlinear effect, the optical amplifier is preferably located between the optical filter and the medium.

As another method of obtaining the local oscillator light, the light to be measured can be split into two portions, followed by launching one of the portions onto the optical filter to limit its bandwidth, and the output light of the optical filter can be used as the local oscillator light. In this case, the local oscillator light and the remaining portion of the light to be measured that is split are incident onto a medium with the third-order optical nonlinear effect to generate the phase conjugated light.

In either of the two methods of obtaining the local oscillator light, the optical amplifier can be inserted to intensify the local oscillator light.

The fundamental idea of the present invention is to construct a novel method for measuring a temporal waveform of the electric field of an optical signal on the basis of the optical nonlinear effect determined by the phase matching condition different from that of the conventional techniques. As the optical nonlinear effect, the inventor of the present invention pays attention to parametric mixing and four-wave mixing. These effects have in common a function to generate a phase conjugated light for the optical signal to be measured.

First, the parametric mixing will be considered. It is an effect corresponding to the reverse process of the sum frequency generation, so to speak. Under the presence of local oscillator light with a frequency v 3, there takes place mixing between any pair of light waves with frequencies $v_1$ and $v_2$ satisfying the relationship $v_1+v_2=v_3$. The two frequencies to be mixed are equal when $v_1=v_2=v_3/2$, which is called a degenerate frequency.

Defining the power conversion efficiency as the ratio of the power of the second light generated to the first light, the foregoing expression (6) holds using the phase mismatch $\Delta k$ in the foregoing expression (2) when the light with the frequency $v_3$ is not extremely strong. As in the foregoing, the phase mismatch $\Delta k$, which gives the first zero point of the efficiency, is translated into the bandwidth (full width) BW of the input light $v_1$ in the neighborhood of the degenerate frequency $v_p$, which is given by the following equation.

$$BW=(\pi DL/2)^{1/2} \quad (11)$$

where D is a second-order dispersion per unit length of the medium at the degenerate frequency. The dispersion is one order higher than the group delay appearing in the foregoing expressions (7) and (8). Accordingly, the effect of the dispersion here is usually small, providing much broader phase matching bandwidth for the same length medium than the conventional system. In addition, notice that the medium length L appears here in the form of $L^{-\frac{1}{2}}$ rather than $L^{-1}$ as in the conventional system.

The difference, which is a natural consequence of the difference in the order of the dispersion, will alleviate the narrowing of the phase matching bandwidth with an increase in the medium length as compared with the conventional system. Thus, because of the foregoing two effects, using the parametric mixing will facilitate implementing such a wide bandwidth, that is, a high temporal resolution as the conventional system cannot accomplish.

Next, the four-wave mixing will be described. It launches the local oscillator light with a degenerate frequency $v_p$ instead of the local oscillator light with the frequency $v_3$. In this case, let us redefine the phase mismatch $\Delta k$ as follows:

$$\Delta k = k_1 + k_2 - 2k_p \quad (12)$$

Then, the power conversion efficiency expression of the foregoing equation (6) holds without change when the light with the frequency $v_p$ is not very intense, so that the bandwidth agrees with the foregoing expression (11). Accordingly, the four-wave mixing can also achieve the same effect as the parametric mixing.

As for the parametric mixing and the four-wave mixing themselves, many researches and reports have been made already, and hence the present invention is not original in this point. However, applying the generated phase conjugated light to measuring waveforms of some optical signals, such as waveforms of electric field or of intensity, has not been reported until now. This is because the phase conjugated light generation up to now employs as an energy source a pump light source independent of the optical signal to be measured. Thus, the phase of the phase conjugated light is statistically completely uncorrelated with the phase of the optical signal to be measured, which does not make possible the observation of the spectral phase.

The foregoing discussion shows that to accomplish the object of the present invention, it is essential to obtain and operate the local oscillator light whose phase is fixed or very slowly varied with respect to the optical signal to be measured.

Typical advantages of the present invention are as follows:

(1) It can substantially improve the sensitivity without requiring a very thin nonlinear medium.
(2) It can measure complex temporal waveforms of the electric field of a ultra-fast optical signal very accurately without using the iterative calculation.
(3) There are two setups based on the parametric mixing and the four-wave mixing: the former can cover a wide wavelength range and measure extremely fast signals; and the latter can be configured more simply and at a lower cost.
(4) Introducing an optical amplifier as needed makes it possible to increase the sensitivity. In addition, it is guaranteed in principle that the optical amplifier does not impair the measurement accuracy.
(5) There are two setups: a first setup conducts multiple times of spectrum acquisitions using an ordinary spectroscopic instrument; and a second setup simultaneously observes the intensity of at least two spectral components, and directly measures the relative phase between the components. The former can utilize the existing spectroscopic instrument, and hence can be implemented at a lower cost. The latter can conduct a highly reliable measurement because it has strong tolerance against the fluctuations in the intensity or polarization of the optical signals to be measured. Since it does not require any particularly stable interferometer, it is used in poor environments with maintaining its performance for a long time. In addition, adopting multi-channel photometry using a linear detector array in the latter setup will implement quick measurement.
(6) Selecting a setup from these plentiful options in accordance with its object can cope with the wide measurement needs, offering great industrial advantages.

BRIEF DESCRIPTION OF THE DRAWINGS

FIGS. 12A–12C are diagrams illustrating phase difference calculation procedures in accordance with the present invention, wherein FIG. 12A illustrates a signal near the center of the spectrum of the optical signal to be measured, FIG. 12B illustrates a signal on a shorter wavelength side, and FIG. 12C illustrates a signal on a longer wavelength side.

DETAILED DESCRIPTION OF THE PREFERRED EMBODIMENTS

The invention will now be described with reference to the accompanying drawings.

Embodiment 1

Figure 1:
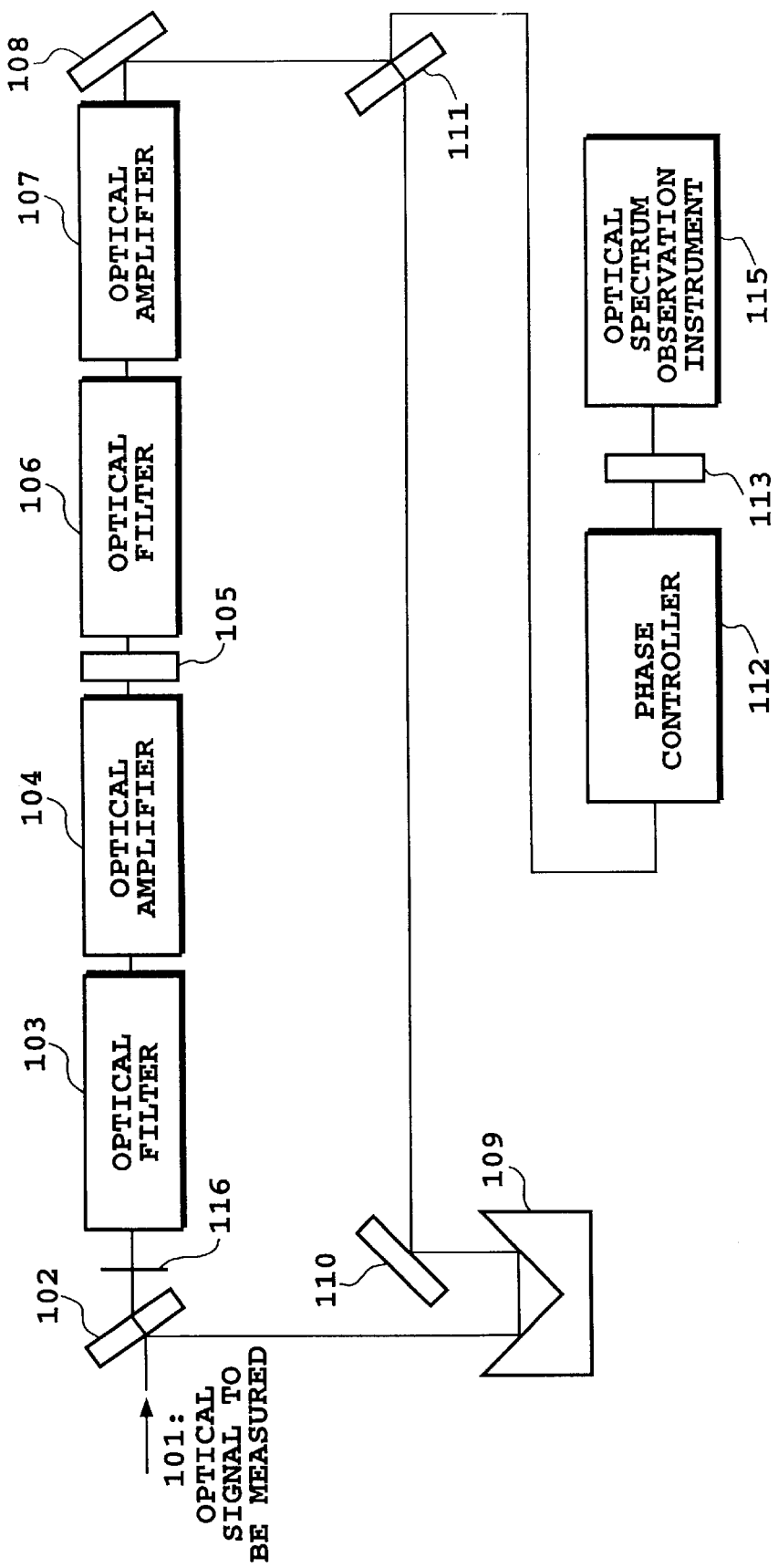
FIG. 1 is a block diagram showing a setup of an embodiment 1 of an apparatus for measuring a temporal waveform of the electric field of an optical signal in accordance with the present invention.

FIG. 1 is a block diagram showing a setup of an embodiment 1 of an apparatus for measuring a temporal waveform of the electric field of an optical signal in accordance with the present invention. The present embodiment corresponds to the structure using the parametric mixing, one of the two nonlinear effects described above. In the configuration of the present embodiment, the local oscillator light with the required frequency $v_3$ is obtained by performing the second harmonic generation (SHG) on a portion of the optical signal to be measured.

As shown in FIG. 1, the present embodiment 1 of an apparatus for measuring a temporal waveform of the electric field of an optical signal comprises: a beam splitter 102; an optical filter 103; an optical amplifier 104; a second-order nonlinear medium 105; an optical filter 106; an optical amplifier 107; reflectors 108, 109 and 110; a beam combiner 111; a phase controller 112; a second-order nonlinear medium 113; an optical spectrum observation instrument 115 and a shutter 116.

The present embodiment 1 of the apparatus for measuring a temporal waveform of the electric field of an optical signal launches an optical signal to be measured 101 to the beam splitter 102. The optical signal to be measured 101 incident onto the beam splitter 102 is split into two portions by the beam splitter 102. One of them is transmitted through the optical filter 103 and optical amplifier 104, and is incident and focused on the first second-order nonlinear medium 105. The second-order nonlinear medium 105 generates the second harmonic and produces the local oscillator light. The local oscillator light generated is transmitted through the optical filter 106 and optical amplifier 107, reflects off the reflector 108 and arrives at the beam combiner 111. On the other hand, the other portion of the optical signal to be measured 101 reflects off the reflector 109 and reflector 110, and arrives at the beam combiner 111. The local oscillator light and the optical signal arriving at the beam combiner 111 are combined by the beam combiner 111, transmitted through the phase controller 112, and incident and focused on the second second-order nonlinear medium 113.

The parametric mixing takes place in the second second-order nonlinear medium 113. The power spectrum of the light emitted from the second second-order nonlinear medium 113 is observed by an optical spectrum observation instrument 115.

As the optical filter 103, a bandpass filter is used for extracting part of the spectrum of the optical signal to be measured. The following optical amplifier 104 is inserted to enhance the power of the extracted light and to raise the efficiency of the second harmonic generation in the first second-order nonlinear medium 105. On the other hand, optical filter 106 following the first second-order nonlinear medium 105 is installed to eliminate the emerging light not converted into the second harmonic light, and to limit when necessary the bandwidth of the generated local oscillator light. To achieve only the former purpose, a high-pass (short-wave-pass) filter is used, and to achieve both of the purposes, a bandpass filter is used. The following optical amplifier 107 is inserted to enhance the power of the generated local oscillator light, and to raise the efficiency of the parametric mixing in the second second-order nonlinear medium 113.

As for the optical amplifier 104 and optical amplifier 107, when the incident light to be measured is powerful enough to generate the local oscillator light by itself, one or both of them can be omitted. Moreover, when the first second-order nonlinear medium 105 itself limits the phase matching bandwidth involved in the second harmonic generation, and hence produces the local oscillator light with a line width much narrower than the spectral width of the optical signal to be measured, the pre-stage optical filter 103 can be omitted, and the post-stage optical filter 106 can be replaced by a high-pass (short-wave-pass) filter.

In this case, the optical filter 106 can be completely omitted by providing the beam combiner 111 with a high-reflection (short-wave-reflection) characteristic to share the function of the optical filter 106.

The phase controller 112 is interposed to adjust the relative phase between the local oscillator light and the optical signal at the entrance to the second-order nonlinear medium 113. Since the frequency (wavelength) of the local oscillator light is as high as twice that of the optical signal, any dispersion materials are usable with a variable thickness. The variation in thickness that provides a one-period (360 degree) phase difference variation is given by the following expression.

$$\lambda_3/[n_g(\lambda_3)-n_g(\lambda_p)] \tag{13}$$

where $\lambda_3$ is the wavelength of the local oscillator light, $\lambda_p$ ($=2\lambda_3$) is the degenerate wavelength, and $n_g(\lambda_3)$ and $n_g(\lambda_p)$ are refractive indices of the dispersion medium at these wavelengths.

For example, when silica glass is used as the dispersion medium, the variation in the thickness for the 1.55 $\mu$m $\lambda_p$ is calculated as 79.6 $\mu$m. Accordingly, the phase difference of one period is adjustable by sliding the silica glass substrate with a one degree wedge by only 4.56 mm in the direction perpendicular to the optical axis. The sliding amount is readable at sufficient accuracy with a common inexpensive device for measuring length such as a micrometer.

In contrast, when using the standard air as the dispersion medium, the thickness variation is 476 mm. In this case, the phase is adjustable by sliding the second-order nonlinear medium 113 along the optical axis, and the sliding amount is readable with a cheaper rule. Strictly speaking, however, correction considering the atmospheric pressure and humidity is required for the air dispersion.

The phase controller 112 can be located between the reflector 108 and beam combiner 111 rather than before the second second-order nonlinear medium 113 so that the phase of the local oscillator light can be controlled independently. Such a phase adjusting method will be described later in connection with FIG. 3.

The reflector 109 is provided for balancing the lengths of the two optical paths from the beam splitter 102 to the beam combiner 111. To achieve the phase adjustment described above effectively, the relative phase between the local oscillator light and the optical signal emitted from the beam combiner 111 must to be stable, which in turn requires that the optical path length difference between the two optical paths must be stable in an order of the wavelength. This is implemented by an ordinary interferometer construction technique. When necessary, an additional optical path length difference monitoring mechanism can be provided to carry out dynamic stabilization through the feedback to the position of the reflector 109. Since these techniques all belong to standard interferometer stabilization means, they can be fully realized by applying existing techniques.

The optical signal to be measured 101 is split by the beam splitter 102 into two portions, and one of them is incident onto the optical filter 103. In this case, if that light is prevented from being transmitted through the optical filter 103 and optical amplifier 104 and hence from being incident and focused on the first second-order nonlinear medium 105 by an incident light termination means such as the shutter 116 located before the optical filter 103, only the remaining portion of the incident optical signal to be measured 101 reflects off the reflectors 109 and 110 and arrives at the beam combiner 111. Thus, the spectrum of the incident optical signal to be measured 101 itself can be observed. In other words, the spectrum of the optical signal to be measured 101 is observed independently.

Figure 2:
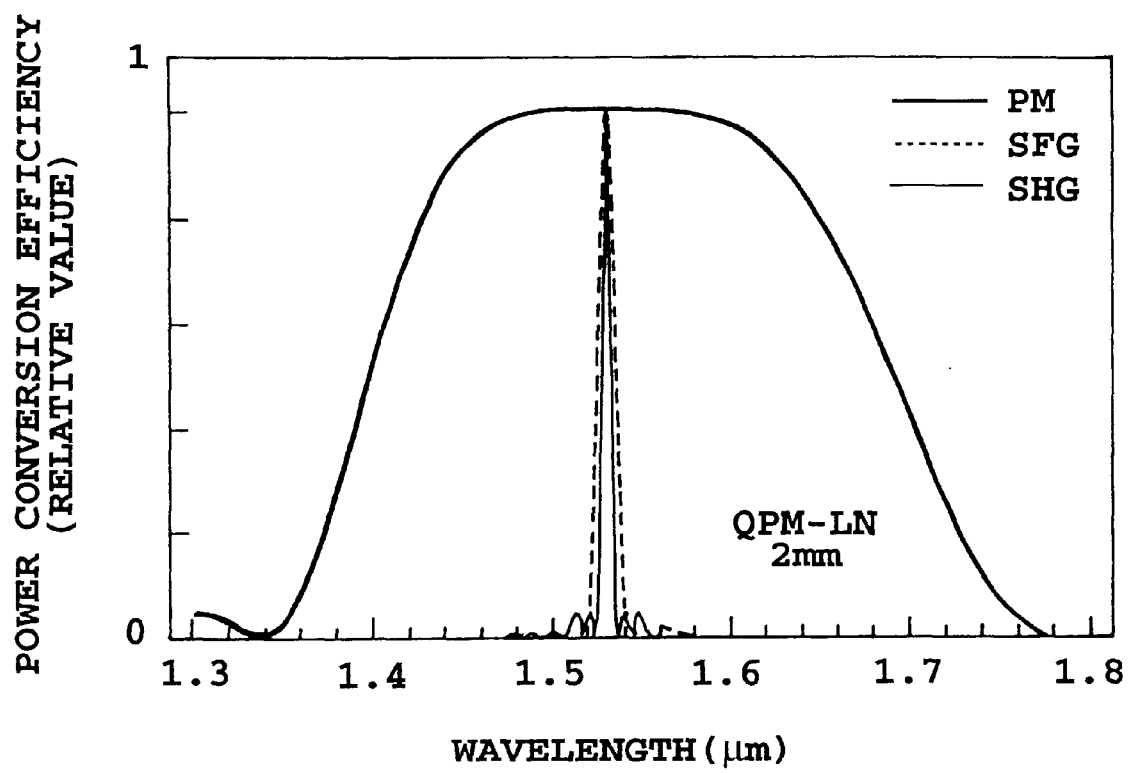
FIG. 2 is a graph illustrating comparative bandwidths associated with a second-order nonlinear medium of the embodiment 1.

FIG. 2 shows a phase matching bandwidth obtained when applying a 2 mm thick quasi phase matching lithium niobate crystal to the second second-order nonlinear medium 113.

FIG. 2 also shows for comparison bandwidths obtained when using the same crystal in the conventional techniques. The parametric mixing according to the present invention (designated by PM in FIG. 2) has a bandwidth as wide as 55.7 THz, corresponding to a level that enables the measurement of an optical signal varying at a rate of 10 fs. In contrast with this, the bandwidths of the conventional techniques are only 1.6 THz for the SHG and 3.2 THz for SFG, in which case even an optical signal varying at a rate of 100 fs cannot be measured. This exhibits that a much broader phase matching bandwidth can be obtained by the present invention as originally planned.

Embodiment 2

Figure 3:
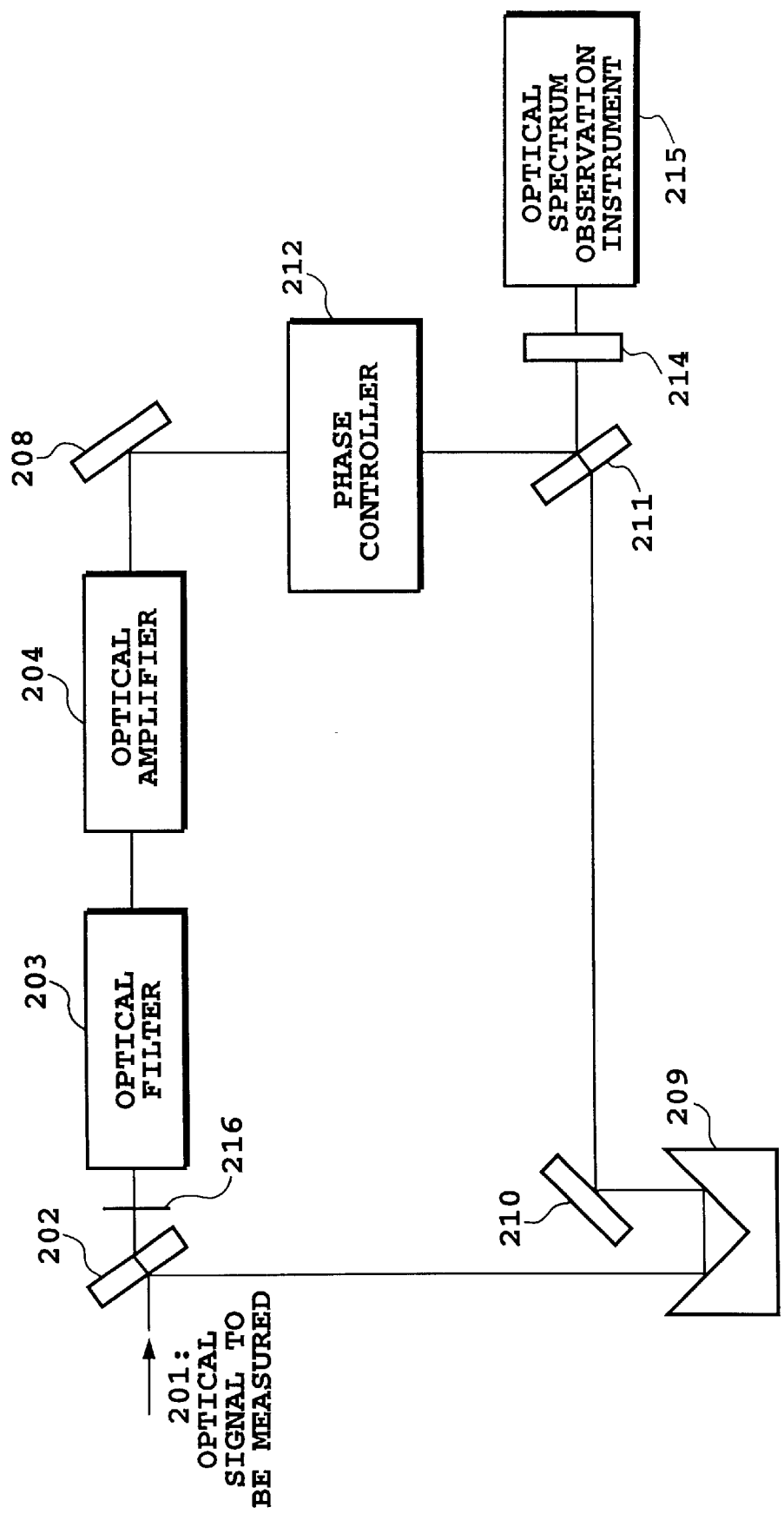
FIG. 3 is a block diagram showing a setup of an embodiment 2 of an apparatus for measuring a temporal waveform of the electric field of an optical signal in accordance with the present invention.

FIG. 3 is a block diagram showing a setup of an embodiment 2 of the apparatus for measuring a temporal waveform of the electric field of an optical signal in accordance with the present invention, which employs the four-wave mixing. The local oscillator light with the frequency $v_p$ required in this case can be easily obtained by extracting a part of the spectrum of the optical signal to be measured by an optical filter.

As shown in FIG. 3, in the present embodiment 2 of the apparatus for measuring a temporal waveform of the electric field of an optical signal, an optical signal to be measured 201 is incident onto a beam splitter 202 to be split into two portions. A first split portion of the optical signal to be measured 201 is transmitted through an optical filter 203 for extracting part of the spectrum to generate the local oscillator light. The local oscillator light passes through an optical amplifier 204, reflects off a reflector 208, passes through a phase controller 212, and arrives at a beam combiner 211. In contrast, a second split portion of the optical signal to be measured 201 reflects off a reflector 209 and a reflector 210, and arrives at the beam combiner 211.

The local oscillator light and the optical signal arriving at the beam combiner 211 are combined to be incident and focused onto a third-order nonlinear medium 214 that carries out the four-wave mixing. The power spectrum emitted from the third-order nonlinear medium 214 is observed by an optical spectrum observation instrument 215.

As the optical filter 203, a bandpass filter is used for extracting a part of the spectrum of the optical signal to be measured. The following optical amplifier 204 is inserted to enhance the power of the extracted local oscillator light and to raise the efficiency of the four-wave mixing in the third-order nonlinear medium 214. It is obvious that the optical amplifier 204 can be omitted when the incident light to be measured is powerful enough that the optical filter 203 can generate the local oscillator light of sufficient power in itself.

The phase controller 212 is inserted to adjust the phase of the local oscillator light. To achieve this, an optical element for varying the refractive index is usable, in which case it is well known that the variation in the refractive index corresponding to the phase shift of one cycle (360 degrees) is $\lambda_p/l$, where $\lambda_p$ is the wavelength of the local oscillator light and l is the device length. As a device for varying the refractive index in response to an input voltage, an electrooptic device or a liquid crystal device is used. Since the latter is inexpensive, it can be preferably applied to the present embodiment 2 which does not require a rapid change in the refractive index.

In the present invention, it is not necessary to carry out the phase adjustment continuously, but at every 45 degree step. Combining this with the fact that the local oscillator light is linearly polarized, a wave plate can also be utilized as the phase controller 212 for the local oscillator light. In the present embodiment 2, a $\lambda/8$ wave plate and a $\lambda/4$ wave plate (quarter-wave plate) are inserted. The fast axes of the two wave plates are aligned with the polarization of the local oscillator light, and this state is adopted as the reference (zero degree). Rotating one of the two wave plates in its plane by an amount of 90 degrees will provide the 45 or 90 degree phase shift, respectively. Incidentally, since the phase adjustment at every 90 degree step is enough in the foregoing embodiment 1, a quarter-wave plate and a half-wave plate are used to carry out a similar operation.

The reflector 209 is provided for balancing the lengths of the two optical paths from the beam splitter 202 to the beam combiner 211. As described before, the stabilization of the optical path length difference between the two optical paths can be implemented using the existing technique.

Figure 4:
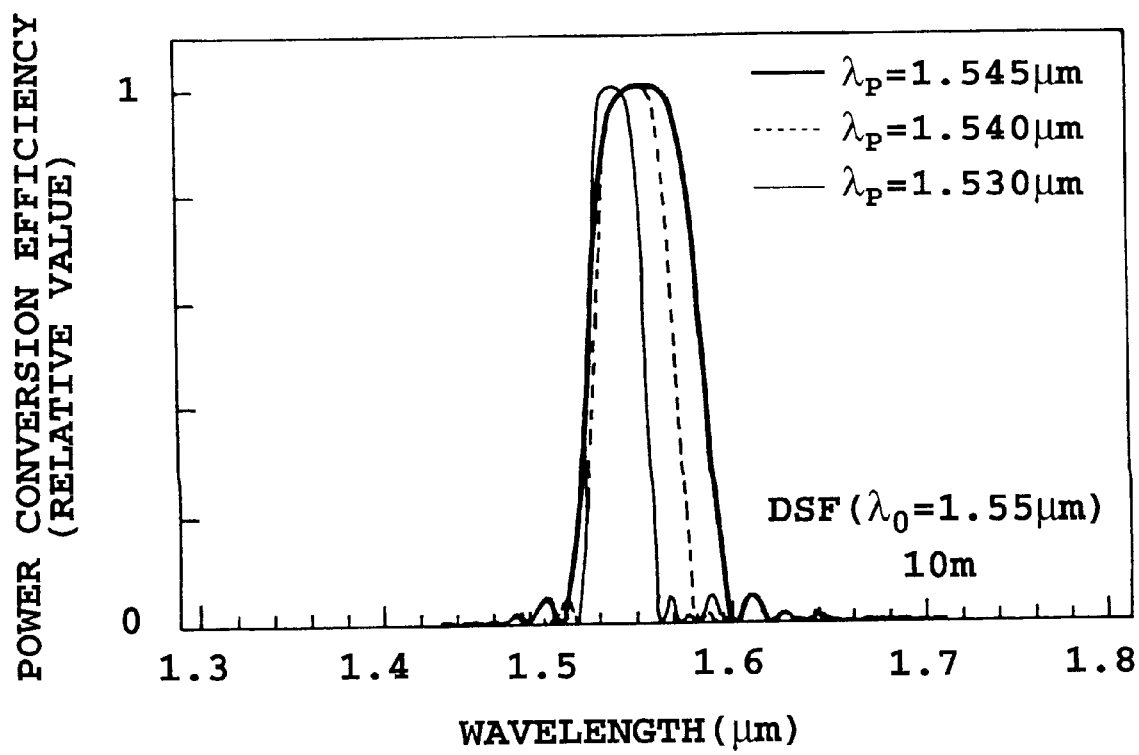
FIG. 4 is a graph illustrating comparative bandwidths associated with a tertiary nonlinear medium of the embodiment 2.

FIG. 4 shows a phase matching bandwidth obtained when using a 10 m long dispersion shifted optical fiber as the third-order nonlinear medium 214. The dispersion shifted optical fiber consists of a quite common optical fiber with a zero-dispersion wavelength at 1.55 μm and dispersion slope of 0.07 ps/km/nm². In this case, because of the long medium length, the third-order dispersion which is one order higher than the second-order dispersion, that is, the dispersion slope has a greater effect. In other words, the distance from the zero dispersion wavelength to the local oscillator light wavelength $\lambda_p$ determines the second-order dispersion at the local oscillator light wavelength via the dispersion slope, and the second-order dispersion determines the bandwidth through the foregoing equation (11). In FIG. 4, the local oscillator light wavelength of 1.545 μm, very close to the zero dispersion wavelength, gives a bandwidth of 12.0 THz, which enables the measurement of an optical signal varying at a rate of 100 fs or so. On the other hand, the local oscillator light wavelength of 1.530 μm, separated further from the zero dispersion wavelength, gives a narrower bandwidth of 6.1 THz, about half the previous example.

As the third-order nonlinear medium 214, a semiconductor waveguide is another candidate besides the optical fiber. However, it is very difficult for semiconductor materials, which have absorption or gain around the wavelength of the optical signal to be measured, to implement responsivity less than a picosecond because of the restriction on the response time of the media, although the efficiency is very high as a result of the real transition involved. Therefore, the semiconductor waveguide is not described here in more detail. Only, the procedure of obtaining the spectral phase described later is applicable to this case without change, and hence it should be noticed that the method for measuring the temporal waveform of-the electric field of an optical signal in accordance with the present invention is also applicable to the materials involving the real transition.

As described above, the configuration based on the four-wave mixing is suitable for measuring an optical signal whose wavelength is predetermined and whose rate of change is about 100 fs at most. For example, it is used for measuring optical signals emitted from typical semiconductor lasers for communications. In contrast with this, although it is more complicated, the foregoing configuration based on the parametric mixing can easily measure optical signals varying at a rate of 10 fs. Furthermore, using the foregoing nonlinear crystal whose phase matching wavelength is tunable makes it possible to obtain such a characteristic that little varies over a wide wavelength range of an optical signal. Thus, the parametric mixing setup is suitable for measuring optical signals emitted from femtosecond solid-state laser. Accordingly, properly using the two configurations according to the present invention can meet the multifold need of the measurement as a whole.

Next, the mixed spectrum obtained by the optical spectrum observation instrument 115 or 215 will be described in detail in connection with its analysis method.

A photon flux spectrum $s(\nu)=S(\nu)/(h\nu)$ is introduced for the power spectrum $S(\nu)$ usually observed as the function of the optical frequency $\nu$, in which case the mixed spectrum obtained in the present invention is given by the following equation.

$$s(\nu_1)=s_1+m^2 s_1+m^2 s_2+2m\sqrt{1+m^2}\sqrt{s_{1 s_2}}\sin(\phi_1+\phi_2-2\phi_p+\delta) \quad (14)$$

where $S_1$ and $S_2$ represent photon flux spectra of the optical signal to be measured at frequencies $\nu_1$ and $\nu_2$; and $\phi_1$ and $\phi_2$ designates spectral phases thereof. Assume here that the frequencies $\nu_1$ and $\nu_2$ satisfy the relationship $\nu_1+\nu_2=2\nu_p$, where $\nu_p$ is the degenerate frequency. The setup based on the parametric mixing employs as the local oscillator light the light with the frequency twice the degenerate frequency ($\nu_3=2\nu_p$). In contrast, the setup based on the four-wave mixing uses the local oscillator light with a frequency equal to the degenerate frequency.

Equation (14) is derived by making an approximation of neglecting the attenuation of the local oscillator light in the nonlinear medium. As for the phase $\phi_p$, it equals half the phase of the local oscillator light ($\phi_3=2\phi_p$) in the parametric mixing, and equals the phase of the local oscillator light in the four-wave mixing.

In equation (14), the mixing coefficient m and phase bias $\delta$ are given by the following equations.

$$m=\frac{g_0}{2}L\mathrm{sinc}\left(\frac{\sqrt{\Delta k^2-g_0^2}}{2}L\right) \quad (15)$$

$$\tan\delta=\frac{\Delta k}{\sqrt{\Delta k^2-g_0^2}}\tan\left(\frac{\sqrt{\Delta k^2-g_0^2}}{2}L\right) \quad (16)$$

where the phase mismatch $\Delta k$, which is previously mentioned, is obtained using equation (2) for the parametric mixing, and equation (12) for the four-wave mixing; and L is the medium length as-mentioned above. A gain coefficient $g_0$, the frequency ($\nu_1$) dependence of which is very small and hence is usually negligible, is expressed by the following equation for the parametric mixing.

$$g_0=\frac{4\sqrt{2}\,\pi\sqrt{Z_0}\,d_{e\!f\!f}}{\sqrt{n_3}\,n_p\lambda_p}\sqrt{\frac{P_p}{A}} \quad (17)$$

For the four-wave mixing, it is expressed as follows.

$$g_0=\frac{4\pi n_2}{\lambda_p}\frac{P_p}{A} \quad (18)$$

where $\lambda_p$ is the degenerate wavelength, $n_p$ is the refractive index of the nonlinear medium at that wavelength, $P_p$ is the power of the local oscillator light, A is the area of the beam focused in the nonlinear medium, $d_{e\!f\!f}$ is an effective nonlinear coefficient, $Z_0$ is a radiation impedance in vacuum and $n_2$ is a nonlinear refractive index.

In the present invention, a large gain coefficient $g_0$ is not required: a value from 0.1 to 0.2 is enough. In this case, the phase bias is reduced to $\delta=\Delta kL/2$ in practice, which can be obtained from the dispersion data of the nonlinear medium before the measurement. The mixing coefficient is reduced to $m=(\frac{1}{2})g_0 L \sin c(\Delta kL/2)$, in which case the power conversion efficiency $m^2$ satisfies the proportional relationship of the foregoing expression (6).

Figure 5A:
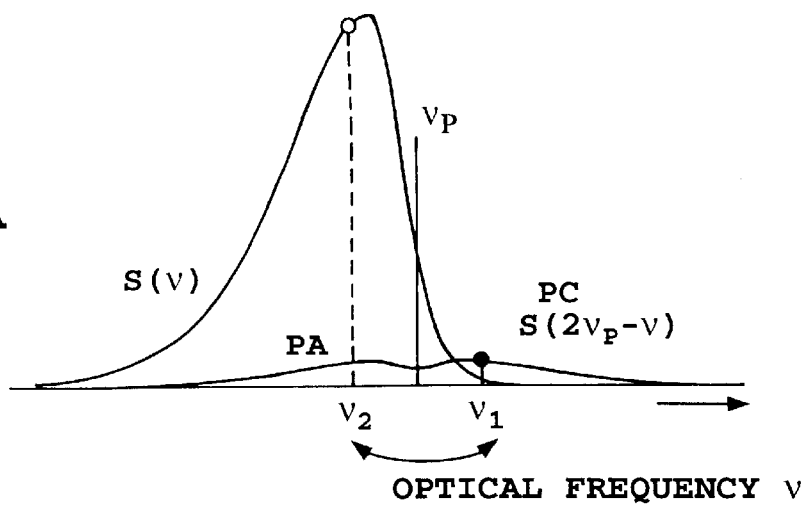
FIGS. 5A–5C are diagrams illustrating the measurement principle of the present invention.
Figure 5B:
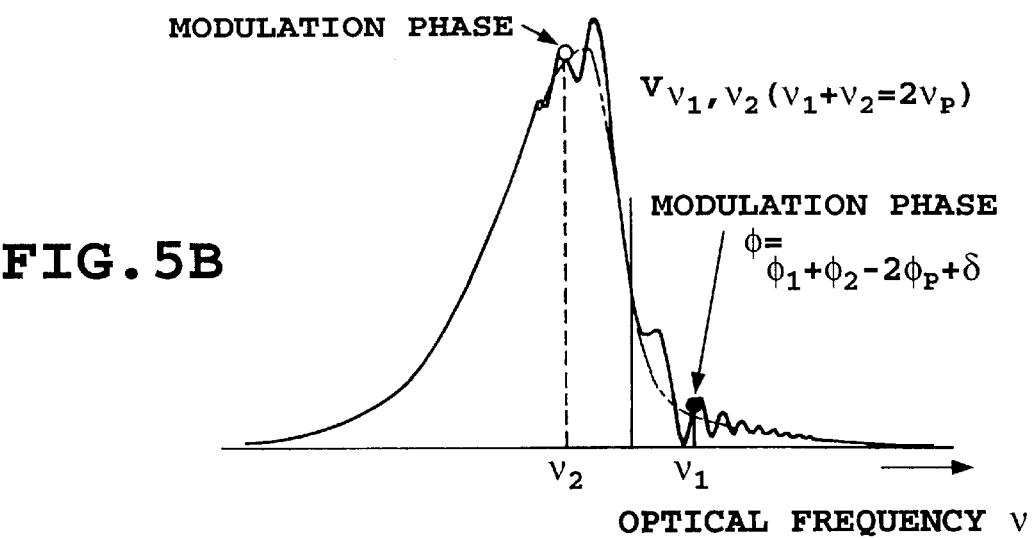
Figure 5C:
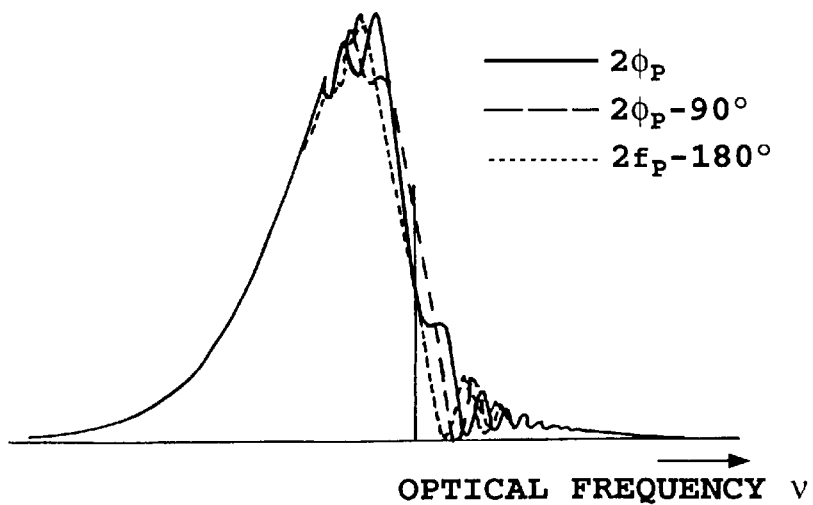

FIGS. 5A–5C illustrate examples of the mixed spectra. First, FIG. 5A illustrates the photon flux spectrum $s(\nu)$ of the optical signal to be measured, the degenerate frequency $\nu_p$, and the photon flux spectrum of the light newly generated by the parametric mixing or by the four-wave mixing. In the present invention, the degenerate frequency $\nu_p$ is preferably set near the center of the spectrum of the optical signal to be measured. The newly generated light can be classified into two types. One of them is the spectrum designated by PA in FIG. 5A, which corresponds to the second term $m^2 s_1$ in the foregoing equation (14). The light has a spectrum similar to the original spectrum $s(\nu)$, and the effect of generating it is called parametric amplification. The other of them is the spectrum designated by PC in FIG. 5A, which corresponds to the third term $m^2 s_2$ in the foregoing equation (14). It is similar to the spectrum $s(2\nu_p-\nu)$, the mirror image of the original spectrum with respect to the degenerate frequency, and the phase of the light is sign-reversed with respect to the original optical signal. Thus, the effect of generating the light is called phase conjugation.

In the present invention, the phase conjugation is of prime importance, and the parametric amplification has no actual function. However, the phase conjugation and the parametric amplification are inseparably linked, and hence it is impossible to bring about only one of them. This is because photons of the local oscillator light are always transformed to the two frequencies $\nu_1$ and $\nu_2$ which are equidistant from the degenerate frequency $\nu_p$ on both side thereof.

As described above, a lot of observations and reports have been made up to now about the generation of the two types of the light waves itself. However, without using the local oscillator light whose phase is fixed or varying very slowly, the observed mixed spectrum is only an incoherent superposition, that is, a simple algebraic sum of the original spectrum and the two spectra. To see this in equation (14), it is enough to find the statistical average over the argument of the sine function, in which case only the initial three terms remain.

The final term of equation (14) becomes observable for the first time by generating the local oscillator light whose phase is fixed or varying very slowly with respect to the optical signal to be measured and by operating the local oscillator light in the setup in accordance with the present invention. The final term has a form in which the following two light waves interfere with each other: the light represented by the term $(1+m^2)s_1$ which is similar to the original spectrum and is enhanced a little by the parametric amplification; and the phase conjugated light represented by the term $m^2 s_2$. Since the phase conjugated light spectrum is obtained by folding the original spectrum with respect to the degenerate frequency, the method for measuring the waveforms of the optical signal in accordance with the present invention is referred to as a frequency folding interferometer.

FIG. 5B illustrates the mixed spectrum including the interference term. The curve denoted by a thin line 20 passing though the middle of the interference oscillation in FIG. 5B represents the simple algebraic sum of the spectra described above. The phase of the interference term is written as $\phi=\phi_1+\phi_2-2\phi_p+\delta$, in which the spectral phases $\phi_1$ and $\phi_2$ of the optical signal to be measured appear. Thus, the direct observation of the spectral phase is implemented by the frequency folding interferometer in accordance with the present invention.

The interference phase $\phi$ is always symmetric with respect to the degenerate frequency. This is because the phase $\phi_p$ is a constant, the phase bias $\delta$ is symmetric in itself, and the spectral phase portion is made symmetric by the $\phi_1+\phi_2$. Thus, the spectral phase is observed in the symmetrized form in the frequency folding interferometer. In this regard, the frequency folding interferometer makes a striking contrast with the conventional frequency shearing interferometer that observes the spectral phase in terms of difference.

To obtain the interference phase $\phi$ accurately from the mixed spectrum independently of the value of the mixed coefficient m, the mixed spectrum is obtained multiple times with changing the fixed phase $\phi_p$. The phase adjustment is carried out using the phase controller 112 or phase controller 212 in the foregoing setup, in which it is preferable to perform the measuring with varying the phase $2\phi_p$ at every 90 degree step. Here, a procedure of such quadrature phase deduction will be described. First, a mixed spectrum is acquired for the reference phase $2\phi_p$. The mixed spectrum, which is designated by Sa, is represented by the foregoing equation (14). Then, after controlling the phase controller such that the phase $2\phi_p$ is reduced by 90 degrees, a mixed spectrum is acquired. The mixed spectrum, which is designated by $S_b$, is represented by an expression obtained by replacing sin in the foregoing equation (14) by cos. Then, after controlling the phase controller such that the phase $2\phi_p$ is reduced by 180 degrees from the initial reference value, another mixed spectrum is acquired.

The spectrum $s_c$ is represented by an expression obtained by replacing sin in the foregoing equation (14) by −sin. From these three mixed spectra, the interference phase $\phi$ is obtained by the following equation.

$$\phi = \tan^{-1} \frac{s_a - s_c}{2s_b - s_a - s_c} \quad (19)$$

FIG. 5C shows the three mixed spectra used in the calculation.

Alternatively, from the four mixed spectra including still another measurement $S_d$ obtained by reducing the phase $2\phi_p$ by 270 degrees from the reference value, the interference phase $\phi$ is obtained by the following equation.

$$\phi = \tan^{-1} \frac{s_a - s_c}{s_b - s_d} \quad (20)$$

This procedure is known as quadrature procedure.

The interference phase $\phi$ thus obtained is folded into the range $[-\pi/2, \pi/2]$ which is the value range of $\tan^{-1}$.

Alternatively, even if using as $\tan^{-1}$ the type taking account of the signs of both denominators and numerators of the foregoing equations (19) and (20), the interference phase $\phi$ is folded into the range $[-\pi, \pi]$. Here, assuming the continuity of the interference phase $\phi$, the phase is continuously 10 extended by compensating the $\pi$ or $2\pi$ discontinuities on the calculated value with the corresponding step for the points after the discontinuity. This is an ordinary operation called "phase unwrapping", and the phase data obtained by the operation is referred to as "symmetrized phase".

As described above, the spectral phase component appears in the symmetrized form $\phi_1+\phi_2$ in the symmetrized phase. Accordingly, a general asymmetric spectral phase cannot be obtained from the single symmetrized phase. To solve the problem, the inventor of the present application carried out intensive investigations, and devised a procedure based on two symmetrized phases obtained by measurement in different conditions with changing the degenerate frequency $v_p$, that is, the center of the symmetrization.

The procedure will now be described in more detail with reference to FIG. 6.

Figure 6:
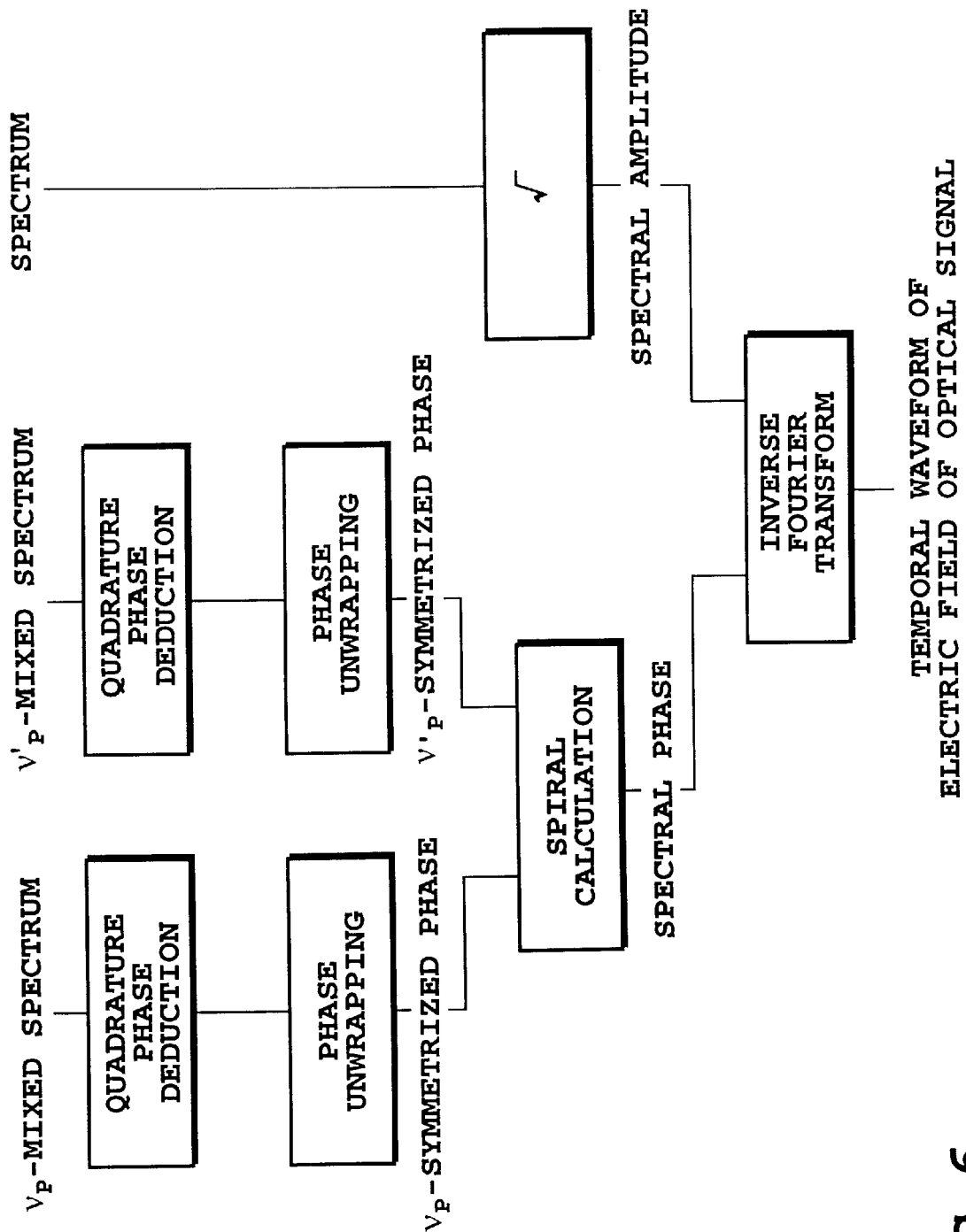
FIG. 6 is a flowchart showing a temporal waveform calculation procedure in accordance with the present invention, which illustrates the calculation operation and data flow from observed quantities to a temporal waveform.

FIG. 6 shows intermediate data, and operations connecting the data to the final calculation of temporal waveform. First, a mixed spectrum is acquired for one degenerate frequency $v_p$, and the symmetrized phase data corresponding to the frequency is obtained in accordance with the procedure described above. Subsequently, after varying the degenerate frequency to $v'_p$, another mixed spectrum is acquired, and the corresponding symmetrized phase data is obtained in a similar manner.

To acquire the mixed spectrum with varying the degenerate frequency in the setup as shown in FIG. 1, it is necessary to shift the passband of the optical filter 103 and optical filter 106, and to tune the phase matching wavelength of the second-order nonlinear medium 105 as needed. Since the post-stage second-order nonlinear medium 113 has sufficiently broad bandwidth, returning its phase matching wavelength is usually unnecessary. In the configuration as shown in FIG. 3, it is enough to shift the passband of the optical filter 203.

The difference between the degenerate frequencies represented by $\Delta v = v'_p - v_p$ gives a step on the frequency axis in the following analysis. Considering this, the above-mentioned two symmetrized phase data are re-sampled with the frequency step of $\Delta v$ if needed. It is obvious that such re-sampling is not required if the acquisition of mixed spectra is initially done with the step $\Delta v$. Subsequently, the phase bias $\delta$ is removed by subtraction from each of them.

As described before, the phase bias is a constant quantity specific to the measuring apparatus, a known value that can be calculated from the dispersion data of the second-order nonlinear medium 113 or third-order nonlinear medium 214.

Here, let us designate the discrete data of the symmetrized spectral phase $\phi_1+\phi_2$ thus obtained by $S_k$ and $S'_k$, and assume for the frequency points index k that n corresponds to the degenerate frequency of the $S_k$ and n' to that of the $S'_k$. According to the definition up to now, n'=n+1. Here the discrete data $P_k$ of the spectral phase is obtained by the following procedure.

(initial value)

$$p_n = s_n/2$$

$$p_{n'} = s'_{n'}/2 \quad (21)$$

(recursion relations)

$$p_{n-k} = s_{n-k} - p_{n'+(k-1)}, p_{n'+k} = s'_{n'+k} - p_{n-(k-1)} \quad (22)$$

Considering the calculation process of the spectral phase in accordance with the recursion relations, the calculation proceeds as if it drew a spiral beginning from the pair of the degenerate frequencies and successively proceeding toward the outside with crossing the degenerate frequencies from left to right and vice versa. From this behavior, the procedure is referred to as a "spiral calculation". Any of the spectral phase once determined in the calculation process is not changed from that time on. Thus, it should be noticed that the spiral calculation does not belong to the iterative calculation.

Once the spectral phase has been obtained in this way, only commonplace processings remain. Specifically, with blocking the local oscillator light by closing the shutter 116 or 216, the power spectra of the optical signal to be measured is obtained by acquiring the spectra in the ordinary manner. After changing the frequency step for the spectral data to Δν as needed, the square root calculation is performed to obtain the spectral amplitude data. Adding to the data the foregoing spectral phase makes a complex spectral amplitude, followed by the inverse Fourier transform of the complex spectral amplitude. This will give the temporal waveform of the electric field of the optical signal.

With the foregoing setup that statically switches the phase $\phi_p$, an error will take place in the calculation of the interference phase $\phi$ using the foregoing equation (19) if the optical signal to be measured varies its intensity, or if the optical path length difference fluctuates during the observation and acquisition of the spectra.

Taking account of this, let us consider another method of switching the phase controller at every 90 degree step with observing the intensity of one of the spectral components of the mixed light. This method would slightly improve the tolerability against the intensity fluctuations of the optical signal to be measured. The method, however, still requires that the optical path length difference between the two optical paths be maintained at a fixed value at the accuracy of an order of the wavelength during an interval in which the foregoing procedure is repeated for all the spectral components.

To obviate the need for stabilizing the optical path length difference, it is necessary for the foregoing procedure to observe at least two spectral components simultaneously. Generally speaking, it is enough for the measurement of the temporal waveform of the electric field of the optical signal to measure only the relative phase between the spectral components. Absolute phase is not required because it does not exert an influence upon the temporal waveform of the electric field of the optical signal.

The fluctuations in the optical path length difference provide the same amount of variations to the interference phases of all the spectral components. Accordingly, the relative phase difference between the interference phases of two spectral components is always accurate independently of the optical path length difference, offering adequate information for the temporal waveform measurement of the electric field of the optical signal.

Once the intensity variations have been observed for two or more spectral components, it becomes unnecessary for the phase controller to carry out switching at 90 degree steps in a calibrated manner. This is because the amount of change in phase $2\phi_p$ can be detected in principle from the intensity variations observed. As a result, the phase controller becomes unnecessary, and can be replaced with a means for changing the relative phase $2\phi_p$ between the local oscillator light and the optical signal to be measured.

Embodiment 3

Figure 7:
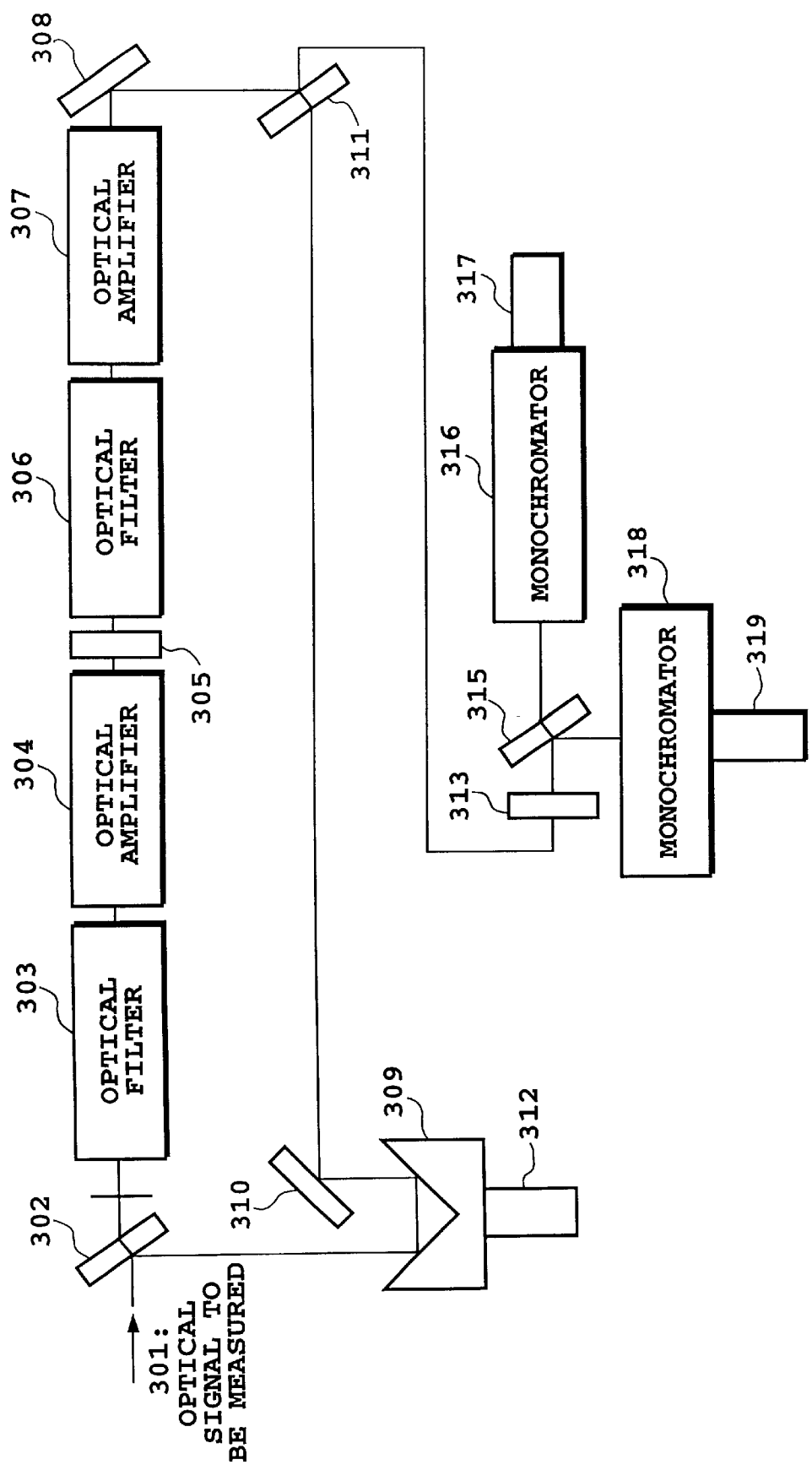
FIG. 7 is a block diagram showing a setup of an embodiment 3 of the apparatus for measuring a temporal waveform of the electric field of an optical signal in accordance with the present invention.

FIG.7 is a block diagram showing a setup of an embodiment 3 of the apparatus for measuring a temporal waveform of the electric field of an optical signal in accordance with the present invention, which observes the intensity of two spectral components at the same time.

The present embodiment 3 of the apparatus for measuring a temporal waveform of the electric field of an optical signal comprises as shown in FIG. 7, a beam splitter 302, an optical filter 303, an optical amplifier 304, a first second-order nonlinear medium 305, an optical filter 306, an optical amplifier 307, a reflector 308, a reflector 309, a reflector 310, a beam combiner 311, a translator 312, a second second-order nonlinear medium 313, a beam splitter 315, a monochromator 316, a photo-detector 317, a monochromator 318 and a photo-detector 319.

In the present embodiment 3 of the apparatus for measuring a temporal waveform of the electric field of an optical signal as shown in FIG. 7, an optical signal to be measured 301 is launched to the beam splitter 302 that splits it into two portions. One of the two split portions of the optical signal to be measured 301 output from the beam splitter 302 is transmitted through the optical filter 303 and optical amplifier 304, and is incident and focused on the first second-order nonlinear medium 305. The first second-order nonlinear medium 305 generates a second harmonic and produces the local oscillator light. The generated local oscillator light is transmitted through the optical filter 306 and optical amplifier 307, reflects off the reflector 308 and arrives at the beam combiner 311.

On the other hand, the other of the two split portions of the optical signal to be measured 301 output from the beam splitter 302 reflects off the reflector 309 and reflector 310, and arrives at the beam combiner 311. The reflector 309 is mounted on the translator 312 so as to vary the optical length of the optical path from the beam splitter 302 to the beam combiner 311 via the reflector 309.

The local oscillator light and the optical signal reaching the beam combiner 311 are combined, and are incident and focused on the second second-order nonlinear medium 313.

The parametric mixing takes place in the second second-order nonlinear medium 313. The mixed light emitted from the second second-order nonlinear medium 313 is split into two portions by the beam splitter 315. The monochromator 316 extracts the spectral component from one of the two split portions, and the photo-detector 317 converts the intensity of the extracted spectral component to an electric signal. Likewise, the monochromator 318 extracts the spectral component from the other of the two split portions, and the photo-detector 319 converts the intensity of the extracted spectral component to an electric signal.

The specifications and operations of the optical filter 303, optical amplifier 304, optical filter 306 and optical amplifier 307 correspond to their counterparts of FIG. 1.

The present embodiment 3 of the apparatus for measuring a temporal waveform of the electric field of an optical signal selects a suitable reference optical frequency $v_r$ for a degenerate frequency $v_p$, and place the monochromator 318 at the optical frequency $v_r$. The reference optical frequency $v_r$ is preferably set near the center of the optical signal spectrum with large spectral intensity. Subsequently, the monochromator 316 is placed at an optical frequency $v$ at which the interference phase is to be measured. Then, the translator 312 is driven so that the reflector 309 is moved backward at nearly a fixed speed. During the backward movement, the output voltages of the photo-detectors 319 and 317 are measured and recorded as a time series. After that, sinusoidal waveform variations that appear as time series data in the outputs of the two photo-detectors are compared to obtain the relative value of the interference phase at the optical frequency $v$ with respect to the reference optical frequency $v_r$. The procedure beginning from the setting of the monochromator 316 is iterated by the number of times of the optical frequency measurement points $v$ required.

Subsequently, after replacing the degenerate frequency $v_p$ with $v'_p$, the interference phase measurement is carried out in a similar manner. Here, a reference optical frequency $v_r'$ may be equal to the reference optical frequency $v_r$ or not. To vary the degenerate frequency $v_p$, it is enough to shift the passband of the optical filter 303 and optical filter 306, and to tune the phase matching wavelength of the first second-order nonlinear medium 105 as needed. Since the post-stage second second-order nonlinear medium 313 has a sufficiently broad bandwidth, the returning of the phase matching wavelength is usually unneeded.

The two interference phase data each undergo the ordinary operation called phase unwrapping to obtain two symmetrized phase data. Solving them using the spiral calculation gives the spectral phase. Once the spectral phase has been obtained, only very simple operations remain. Specifically, with blocking the local oscillator light, the power spectrum of the optical signal to be measured is obtained by scanning the monochromator 316 or monochromator 318 normally and recording its detection output. The spectral data undergoes the square root calculation to obtain spectral amplitude data, to which the spectral phase obtained before is attached in order to make them complex, followed by the inverse Fourier transform of the complex amplitude. Thus, the temporal waveform of the electric field of the optical signal is calculated.

Embodiment 4

Figure 8:
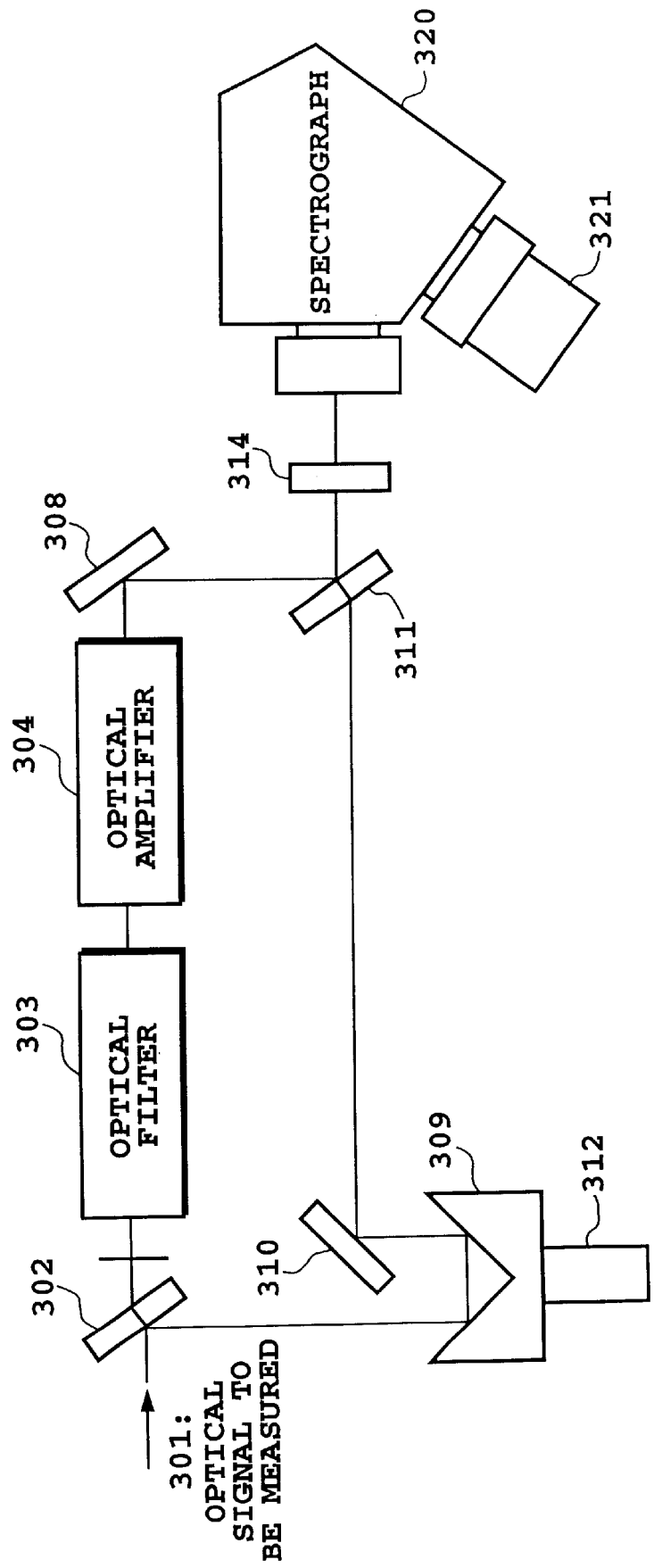
FIG. 8 is a block diagram showing a setup of an embodiment 4 of the apparatus for measuring a temporal waveform of the electric field of an optical signal in accordance with the present invention.

FIG. 8 is a block diagram showing a setup of an embodiment 4 of the apparatus for measuring a temporal waveform of the electric field of an optical signal in accordance with the present invention, which observes the intensity of all the spectral components at the same time using a photo-detector array.

The present embodiment 4 of the apparatus for measuring a temporal waveform of the electric field of an optical signal comprises as shown in FIG. 8, abeam splitter 302, an optical filter 303, an optical amplifier 304, a reflector 308, a reflector 309, a reflector 310, a beam combiner 311, a translator 312, a third-order nonlinear medium 314, a spectrograph 320 and a linear detector array 321.

In the present embodiment 4 of the apparatus for measuring a temporal waveform of the electric field of an optical signal as shown in FIG. 8, the optical signal to be measured 301 is incident onto the beam splitter 302 that splits it into two portions. One of the two split portions of the optical signal to be measured 301 output from the beam splitter 302 is transmitted through the optical filter 303 that extracts part of the spectrum as the local oscillator light. The local oscillator light passes through the optical amplifier 304, reflects off the reflector 308 and arrives at the beam combiner 311.

On the other hand, the other of the two split portions of the optical signal to be measured 301 output from the beam splitter 302 reflects off the reflector 309 and reflector 310, and arrives at the beam combiner 311. The reflector 309 is mounted on a translator 312 so as to vary the optical length of the optical path from the beam splitter 302 to the beam combiner 311 via the reflector 309. The local oscillator light and the optical signal arriving at the beam combiner 311 are combined, and incident and focused onto the third-order nonlinear medium 314. A four-wave mixing takes place in the third-order nonlinear medium 314, and the mixed light emitted from the third-order nonlinear medium 314 is incident onto the spectrograph 320. The spectrograph 320 separates the spectral components, and the intensities of all the spectral components are simultaneously observed by the linear detector array 321.

The specifications and operations of the optical filter 303 and optical amplifier 304 correspond to those of their counterparts of FIG. 3.

The present embodiment 4 of the apparatus for measuring a temporal waveform of the electric field of an optical signal drives the translator 312 for a particular degenerate frequency $v_p$, so that the reflector 309 is moved backward at nearly a fixed rate. During the backward movement, the output voltages of the linear detector array 321 are read repeatedly and recorded as a time series. After that, the reference optical frequency $v_r$ is determined appropriately. The reference optical frequency $v_r$ is preferably set near the center of the spectrum, where the spectral intensity of the optical signal is large.

Subsequently, by comparing the sinusoidal waveform variations appearing in the time series data obtained from each pixel of the linear detector array 321 against the data from a pixel for the reference optical frequency $v_r$, the relative values of the interference phases at the optical frequency $v$ of the individual pixels are obtained against the reference optical frequency $v_r$.

Then, after changing the degenerate frequency $v_p$ to $v'_p$, the interference phase measurement is repeated in a similar manner. Here, the reference optical frequency $v_r'$ may be equal to the reference optical frequency $v_r$ or not. To vary the degenerate frequency in the present embodiment, it is enough to shift the passband of the optical filter 303.

From the two interference phase data thus obtained, the spectral phase is calculated as described above. In addition, with blocking the local oscillator light, the output voltages of the linear detector array 321 are read to obtain the power spectrum of the optical signal to be measured. The spectral data undergoes the square root calculation in the manner described above to obtain spectral amplitude data, to which the spectral phase obtained above is attached in order to make them complex, followed by the inverse Fourier transform of the complex amplitude. Thus, the temporal waveform of the electric field of the optical signal is calculated.

Although the mixed light obtained by the parametric mixing is observed using the two monochromators and the photo-detectors in FIG. 7, the mixed light obtained by the four-wave mixing is observed using the spectrograph and the linear detector array in FIG. 8. It is obvious that any combinations of the means for obtaining the mixed light and the means for observing it are possible. For example, the mixed light obtained by the parametric mixing can be observed using the spectrograph and the linear detector array.

As shown in FIGS. 7 and 8, the reflector 309 is mounted on the translator 312 so that the optical path length from the beam-splitter 302 to the beam combiner 311 via the reflector 309 can be varied. Alternatively, the same effect can be achieved by mounting the reflector 308 on the translator to vary the optical path length on the local oscillator light side from the beam splitter 302 to the beam combiner 311 via the reflector 308.

As the translator 312, various devices are available. Generally, when the reflector 309 is shifted backward by the translator by an amount x, the variation $\Delta\phi$ of the interference phase $\phi$ is given by the following equation (23).

$$\Delta\phi = 2\pi \frac{2x}{c} 2v_p \qquad (23)$$

where $v_p$ is the degenerate frequency and c is the speed of light in air, and the coefficient 2 before x is due to the effect of folding the optical signal on the reflector 109. On the other hand, when the reflector 308 is mounted on the translator as described above, the variation $\Delta\phi$ of the interference phase $\phi$ for the backward movement x is given by the following equation (24).

$$\Delta\phi = -2\pi \frac{\sqrt{2x}}{c} 2v_p \qquad (24)$$

where the coefficient $\sqrt{2}$ is due to that fact that the local oscillator light is incident onto the reflector 308 with an angle of 45 degrees, and the negative sign on top of the right-hand side is due to the fact that the optical length on the local oscillator light side is varied in this case.

To accomplish the object of the present invention, it is preferable that the variation $\Delta\phi$ of the interference phase $\phi$ exceed $2\pi$. For example, a minimum variation x needed for the optical signal in 1.5 $\mu$m wavelength region is 0.38 $\mu$m according to equation (23), and 0.53 $\mu$m according to equation (24). The minimum variation x will further reduce in proportion to the wavelength for the optical signal with a shorter wavelength. Such an order of the variation can be easily provided by a piezoelectric actuator. A translator with a larger displacement is also usable such as an electromagnetic translator with a stroke of 0.1–1 mm, or a crankshaft translator with a stroke up to a few centimeters.

Next, a calculation method will be described in detail for obtaining a relative value of the interference phase from two output time series data, one for the objective optical frequency v and the other for the reference optical frequency $v_r$.

The spectral output data V(v) for the objective optical frequency v is expressed by the following equation (25).

$$V(v) = \eta\left(s + m^2 s + m^2 \frac{v}{v'} s' + 2m\sqrt{1+m^2} \sqrt{\frac{v}{v'} s\, s'} \sin(\phi + \Delta\phi)\right) \qquad (25)$$

where S and S' are power spectra of the optical signal to be measured at the frequencies v and v', respectively, which are assumed to satisfy the relationship $2v_p=v+v'$ for the degenerate frequency $v_p$, $\phi$ is the interference phase and $\eta$ is the efficiency/conversion coefficient of the photo-detection system.

Likewise, the spectral output data $V(v_r)$ for the reference optical frequency $v_r$ is expressed by the following equation (26).

$$V(v_r) = \qquad (26)$$
$$\eta_r\left(s_r + m_r^2 s_r + m_r^2 \frac{v_r}{v_r'} s_r' + 2m_r\sqrt{1+m_r^2} \sqrt{\frac{v_r}{v_r'} s_r\, s_r'} \sin(\phi_r + \Delta\phi)\right)$$

where Sr and Sr' are power spectra of the optical signal to be measured at the frequencies $v_r$ and $v_r'$, respectively, which are assumed to satisfy the relationship $2v_p=v_r+v_r'$ for the degenerate frequency $v_p$; $\phi_r$ is the interference phase; and $\eta_r$ is the efficiency/conversion coefficient of the photo-detection system.

First, an ideal case will be considered in which all the quantities except for $\Delta\phi$ in the right-hand sides of equations (25) and (26) are constants, and the $\Delta\phi$ varies linearly with time. In this case, three time points, at which the $\Delta\phi$ differs by 90 degrees from each other, can be easily found from the $V(v_r)$ data. For example, two adjacent zero points of the derivative of the $V(v_r)$ have the $\Delta\phi$ difference of 180 degrees. Then, the midpoint of the two zero points will give the time point that provides the $\Delta\phi$ with a 90 degree increment from the first zero point. Reading the value of the V(v) at the three points thus obtained, and substituting them into the foregoing equation (19) for $s_a$, $s_b$ and $s_c$ will give the interference phase. Such a calculation method exactly corresponds to performing the quadrature phase deduction calculation, which is described above before the embodiment 3 on the data obtained by the setup in accordance with the present invention.

However, the above-mentioned simple calculation is impractical because the quantities other than the $\Delta\phi$ in the right-hand sides of equations (25) and (26) cannot be considered constant, or the $\Delta\phi$ is not expected to vary strictly linearly with time. The former reason is due to inevitable variations in the intensity of the optical signal to be measured and in the incident polarization, and the latter reason is due to unavoidable fluctuations in the optical path length difference because of external disturbances.

These undesirable factors are the very problems to be solved by the present invention. In the present invention, the foregoing embodiments have already greatly reduced the effects of the factors as compared with the conventional systems by limiting the effects to those taking place only during the backward movement of the translator 312. However, since the duration of the backward movement is not negligible, it will be too optimistic to entirely disregard the effects in the duration. Taking account of this, a more robust phase difference calculation method is desired to overcome such effects.

Furthermore, the foregoing calculation method is not enough in terms of the efficiency of data utilization. Specifically, only three points are utilized among the time series data of the spectral output data V(v) at the optical frequency v to be measured. In contrast with this, the total number of the time series data is order-of-magnitude larger. Thus, it is unavoidable that the foregoing calculation method is regarded inefficient in processing data. It will be naturally expected that using more data points will alleviate the adverse effect of noise such as dark current of the photo-detectors.

Thus, the following more effective phase difference calculation method is conceived.

The foregoing output time series data are expressed in more simple forms: $V(v)=b+a \sin(\phi+\Delta\phi)$, and $V(v_r)=b_r+a_r \sin(\phi_r+\Delta\phi)$, where b, a, $b_r$ and $a_r$ are constants in an ideal case. In practice, however, they are quantities that vary more slowly than the sine functions. The $\Delta\phi$ varies nearly linearly with time.

Assume that a time series represented as $V(v_r)'=b_r+a_r\cos(\phi_r+\Delta\phi)$ is generated from the time series $V(v_r)$, and that integrals of the products $V(v)V(v_r)$ and $V(v)V(v_r)'$ over an integration interval $\Delta\phi_L<\Delta\phi<\Delta\phi_H$ are represented by $I_s$ and $I_c$.

When the coefficients b, a, $b_r$ and $a_r$ are constants, the integrals can be easily evaluated, giving the following resultant equations (27) and (28).

$$I_s = F_s(\theta)\bigg|_{\theta=\Delta\phi_L}^{\Delta\phi_H} + \left\{bb_r + \frac{1}{2}aa_r\sin(\phi-\phi_r)\right\}(\Delta\phi_H - \Delta\phi_L) \quad (27)$$

$$I_c = F_c(\theta)\bigg|_{\theta=\Delta\phi_L}^{\Delta\phi_H} + \left\{bb_r + \frac{1}{2}aa_r\cos(\phi-\phi_r)\right\}(\Delta\phi_H - \Delta\phi_L) \quad (28)$$

where two indefinite integrals given by the following equations (29) and (30) are introduced.

$$F_s(\theta) = -b_r a \cos(\phi+\theta) + ba_r\sin(\phi_r+\theta) - \frac{1}{4}aa_r\cos(\phi+\phi_r+2\theta) \quad (29)$$

$$F_c(\theta) = -b_r a \cos(\phi+\theta) - ba_r\cos(\phi_r+\theta) - \frac{1}{4}aa_r\sin(\phi+\phi_r+2\theta) \quad (30)$$

From the foregoing equations (27) and (28), it is found that the second terms of the right-hand side increase indefinitely as compared with the first terms with an increase of the integration interval ($\Delta\phi_L$, $\Delta\phi_H$). The first terms become zero when the limits $\Delta\phi_L$ and $\Delta\phi_H$ of the interval are equal in the modulo $2\pi$ residue system. This is because the two indefinite integrals are periodic functions with a period $2\pi$.

In addition, the contents in the braces of the second terms in equations (27) and (28) are reduced to trigonometric functions including the phase difference $\phi-\phi_r$, or when the coefficient b or $b_r$ is zero. In this case, the phase difference can be obtained from the following equation.

$$\phi - \phi_r = \tan^{-1}\frac{I_s}{I_c} \quad (31)$$

Although the foregoing equations are formulated when the coefficients b, a, $b_r$ and $a_r$ are constants for the sake of simplicity, the calculation of the phase difference according to equation (31) also holds when these coefficients vary slowly so that they can be regarded as constants for a period of the sine functions.

The requirements for calculating the phase difference are summarized in the following three points: (a) Obtaining time series with the phase difference of 90 degrees with respect to the reference time series; (b) Having a long integration interval, or (b') Having an integration interval equal to an integer multiple of the period; and (c) No DC component being contained at least in the reference time series.

The phase difference evaluation principle as described above actually made the basics of phase sensitive detectors such as lock-in amplifiers using electronic circuits. In such equipment, the foregoing three requisites are implemented using (a) A 90 degree phase shifter; (b) A lowpass filter that sufficiently cuts-off the reference frequency; and (c) An AC coupled signal input.

It is very difficult, however, for the present invention to take such conventional equipment as a model. A basic reason for this is attributed to the limitation on the translator 312. That is, no existing translator can move fast enough to use the 90 degree phase shifter, or implement such a long stroke as satisfying the condition (b). This is because the speed and stroke are usually incompatible in the translator.

In view of this, the inventor of the present application conceives a strategy for satisfying the foregoing three requisites by means of software.

More specifically, to meet the foregoing requisite (a), the $V(v_r)'$ is generated from the $V(v_r)$ by the Hilbert transform. In place of the difficult requisite (b), the requirement (b)' is adopted, and the integration interval is decided by detecting the period of the $V(v_r)$ to satisfy the requisite (b)'. For the requisite (c), the DC component in the $V(v_r)$ is removed numerically. It is more effective if the spectral output time series $V(v_r)$ and $V(v)$ are acquired from the beginning by the AC coupling as in the conventional equipment.

Figure 9:
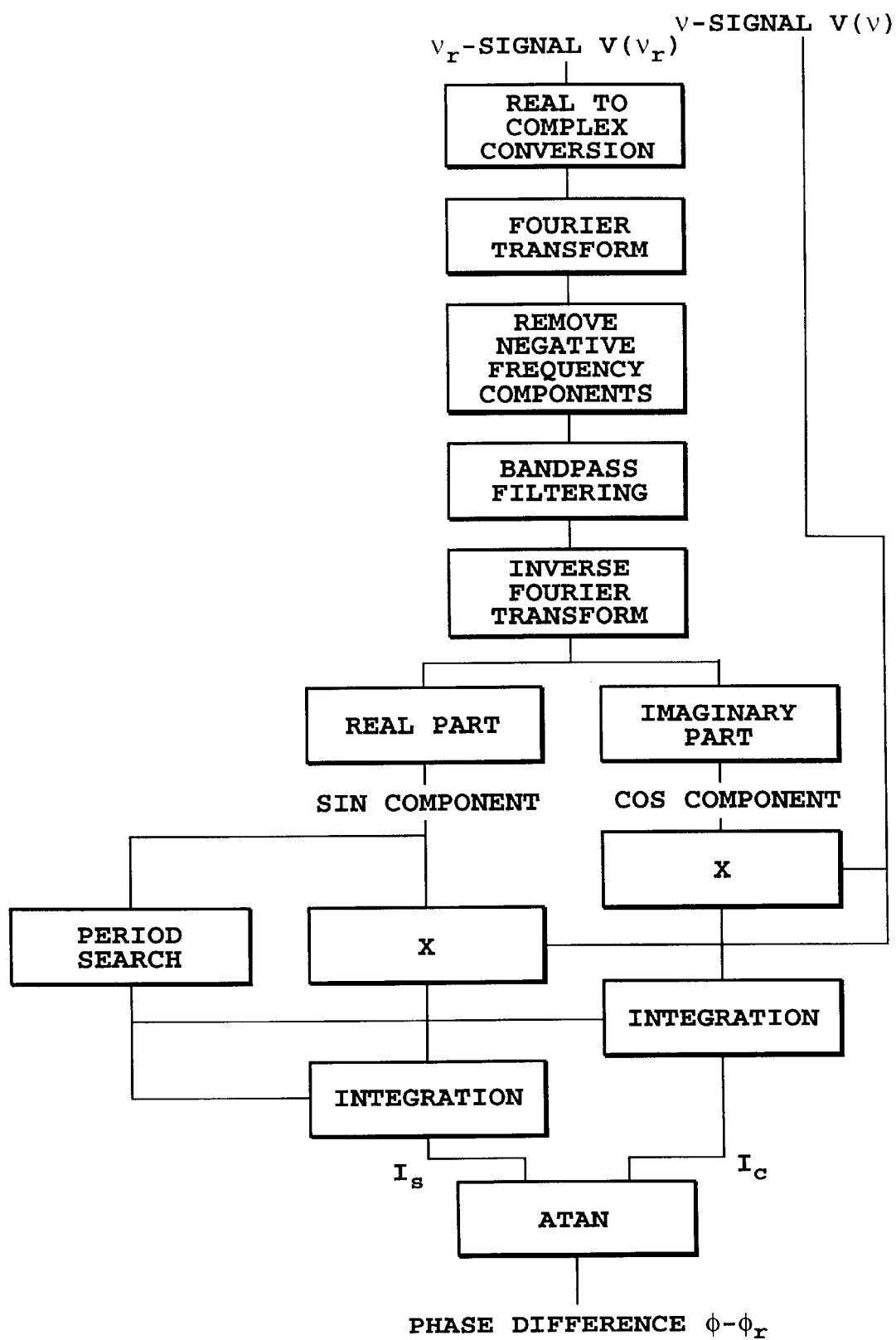
FIG. 9 is a flowchart illustrating a phase difference calculation procedure in accordance with the present invention.

FIG. 9 is a flowchart illustrating the foregoing phase difference calculation procedure in the present embodiment 4 in accordance with the present invention.

First, the spectral output time series data $V(v_r)$ at the reference optical frequency $v_r$ is made complex, followed by the Fourier transform of the complex time series data. In the frequency domain thus obtained, all the negative frequency components are replaced by zero, and the result is subjected to the inverse Fourier transform. The real part gives the original time series $V(v_r)$, whereas the imaginary part gives the time series $V(v_r)'$ with the phase shifted by 90 degrees from that of the original time series $V(v_r)$. The above corresponding to the Hilbert transform algorithm using the Fourier transform.

Carrying out bandpass filtering for eliminating the zero frequency in the frequency domain can remove the DC component of the time series $V(v_r)$ at the same time, which is efficient. Searching for the zero points of the time series $V(v_r)$ after removing the DC components makes it possible to obtain the period accurately. The longest interval among the intervals which are contained in the time series $V(v_r)$ and are equal to integer multiples of the period, is selected as the integration interval. Subsequently the spectral output time series data $V(v)$ at the objective optical frequency $v$ is multiplied by the time series data $V(v_r)$, followed by the integration of the product over the integration interval selected above, resulting in $I_s$. Likewise, the time series data $V(v)$ is multiplied by $V(v_r)'$, followed by the integration of the product, resulting in $I_s$. Finally, in accordance with the foregoing equation (31), the phase difference $\phi-\phi_r$ is calculated from the ratio of the $I_s$ to $I_c$.

Figure 10:
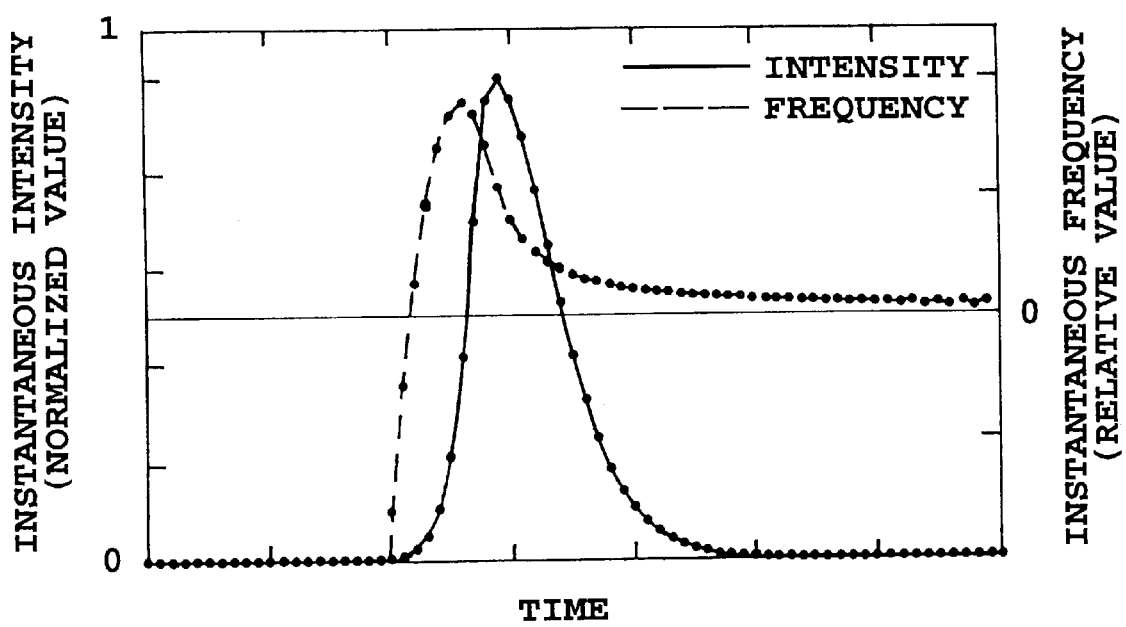
FIG. 10 is a graph illustrating a temporal waveform calculation procedure in accordance with the present invention, which is applied to a rather simple optical signal.
Figure 11:
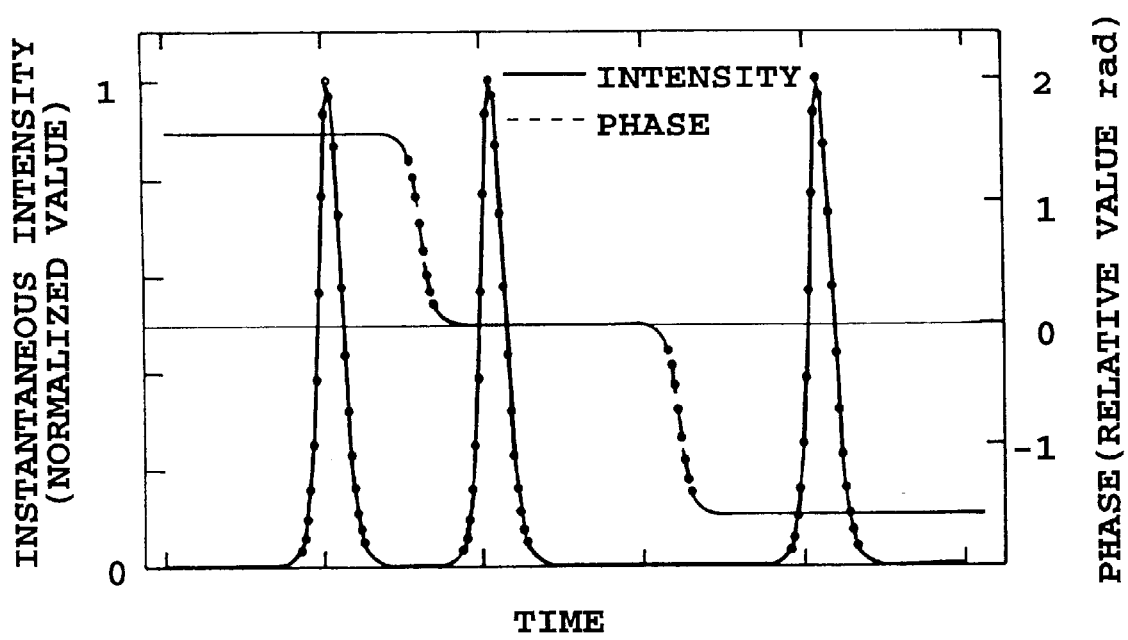
FIG. 11 is a graph illustrating a temporal waveform calculation procedure in accordance with the present invention, which is applied to a complicated optical signal.

FIGS. 10 and 11 verify the effectiveness of the calculation procedure of the temporal waveform in accordance with the present invention. Both figures show in comparison with an original temporal waveform a temporal waveform recovered from simulated acquisition data which was generated by a computer from the original temporal waveform.

FIG. 10 illustrates a rather simple optical signal which is expected to be emitted from a semiconductor laser. Such a simple optical signal can be handled even by the traditional method for measuring the electric field waveform based on the iterative calculation. In FIG. 10, a line represents the original temporal waveform, and dots denote the recovered result by the temporal waveform calculation procedure. The phase characteristic of the electric field waveform is illustrated in terms of the instantaneous frequency given by the following equation.

$$\delta v = -(2\pi)^{-1} d\phi(t)/dt \qquad (32)$$

A phenomenon that the instantaneous frequency varies with time is called (frequency) chirping, and semiconductor lasers are well known of having large chirping in the pulses. From FIG. 10, it is found that the electric field waveform is completely recovered in this case. In particular, it is noticeable that that the instantaneous frequency is highly accurately recovered up to the far wing of the trailing edge of the pulse at which the instantaneous intensity becomes so small. It is difficult for the method based on the iterative calculation to reconstruct the phase or instantaneous frequency in far wings even in such a computer simulation. As for simulation results based on the iterative calculation, see page 1228, left column, in the research paper of IEEE Journal of Quantum Electronics, Vol. 25 (1989), pp. 1225–1233.

FIG. 11 assumes a more complicated optical signal corresponding to a data sequence subject to digital modulation commonly used in optical communication. In the optical signal, the third pulse of a pulse train consisting of four pulses is removed by intensity modulation, and the phases of the remaining pulses are shifted by $\pi/2$ steps using phase modulation.

Such a complicated optical signal belongs to a class that cannot be retrieved by the old measuring method of the electric field waveform based on the iterative calculation. From FIG. 11, it is also found that the electric field waveform is completely recovered by the procedure in accordance with the present invention. In particular, it is noticeable that the transition behavior of the phases from pulse to pulse across very weak instantaneous intensity is reproduced with high fidelity.

The method in accordance with the present invention, and the configurations and operations of the apparatus for implementing the method are basically described thus far in connection with the embodiments 1–4. Next, more concrete examples of the foregoing embodiment 1 will be described in connection with examples 1–9 in accordance with the present invention, and more concrete examples of the foregoing embodiment 2 will be described in connection with examples 10–11 in accordance with the present invention. Incidentally, in the examples 1–11, only numerical description of the operation conditions are given. Besides, the foregoing embodiments 3 and 4 are described in connection with examples 12 and 13 in accordance with the present invention. In the two examples, differences from the other examples, that is, the observation of the intensities of two or more spectral components, and the results of the phase difference calculation procedure between them, will be described.

EXAMPLE 1

A now-available femtosecond Ti:sapphire laser can generate 10 fs pulses in 0.8 μm wavelength region. To measure the pulses conventionally, a BBO (barium borate) crystal of about 50 μm thick has been used. The embodiment 1 in accordance with the present invention was setup using this well-known crystal species. A pulse train consisting of 10 fs pulses with average power of 100 mW, repetition frequency of 100 MHz and center wavelength of 0.85 μm was used as the optical signal to be measured 101. The beam splitter 102 reflected off 1% of the optical signal to be measured 101 to the reflector 109. The remaining 99% was incident and focused onto the first second-order nonlinear medium 105 through a 20 mm focal length lens. As the first second-order nonlinear medium 105, a 2 mm thick BBO crystal was chosen, and the angular phase matching was made such that the light was incident from the direction of 29.5 degrees with respect to the crystal optic (c) axis. In this case, the second harmonic light with average power of 32 mW and with a spectral width of 4.1 nm (6.8 THz) was obtained.

The group delay mismatch of the angular phase matching BBO crystal involved in the second harmonic generation (SHG) was 165 fs/mm, and hence the spectral width of the second harmonic light was expected to be 2.7 THz according to the foregoing equation (7). As compared with the estimation, the actually obtained spectral width was broader. This is because the entire length of the crystal was not used effectively owing to the walk-off effect in which the propagation direction of the power of the second harmonic light deviates from the propagation direction of the incident light in the crystal. Then, to limit the spectral bandwidth of the second harmonic light, a 0.5 nm wide tunable filter was used as the optical filter 106. The local oscillator light passing through the optical filter 106 had average power of 3.9 mW, from which the peak power was estimated to be 110 W. A silica glass substrate with a one degree wedge was used as the phase controller 112, in which case the slide amount for one period was 1.61 mm. A 1 mm thick BBO crystal was chosen as the second second-order nonlinear medium 113 to institute the angular phase matching as before. In this case, the walk-off effect was avoidable by launching and focusing the local oscillator light and optical signal to be measured with an angle formed between them. The angle was set at 3.7 degrees, and they were incident and focused onto the medium through a 10 mm focal length lens. The second dispersion in the 1 mm thick BBO crystal was 68 fs², and hence a 97 THz bandwidth is expected from the foregoing equation (11). It is a sufficient bandwidth for measuring the 10 fs pulses. In this setup, the mixing coefficient m was observed to be 0.17 on the mixed spectrum, and the interference phase was observed. By setting the wavelength alteration for the pump light at 1.1 nm (1.8 THz) and the frequency step at 0.9 THz, the spectral phase was obtained. The frequency step provided sufficiently high resolution for the 10 fs pules.

EXAMPLE 2

The foregoing example 1 leaves significant dissatisfaction in the sensitivity. The main reason for this is that the angular phase matching BBO crystal unavoidable of the walk-off effect was used in the first stage. In view of this, it was replaced by a quasi phase matching lithium niobate (QPM-LN) crystal that had no walk-off effect and was able to achieve higher efficiency. Thus, a 1 mm long QPM-LN crystal bearing the domain inversion of a 3.25 μm period was used as the first second-order nonlinear medium 105. Being incident and focused on the crystal through the 10 mm focal length lens, the optical signal to be measured 101 was able to generate, even its average incident power was reduced to 20 mW, the second harmonic light with an average power of 5 mW. Its spectral width was 0.35 nm (0.57 THz), which well agreed with the value obtained from equation (7). Since a desired spectral width was already obtained, an unconverted light cut filter is enough as the optical filter 106, and hence a 0.8 μm wavelength region total reflector was used as the optical filter 106.

The peak power of the local oscillator light was estimated to be 65 W. In this case, the direction of polarization of the local oscillator light was perpendicular to the direction required by the second-stage BBO crystal. Thus, the direction of polarization had to be matched by interposing a half-wave plate before the light arrived at the beam combiner 111. The remaining structure was the same as that of the example 1, in which the mixing coefficient of 0.13 was observed, enabling the observation of the interference phase. The wavelength of the local oscillator light was varied by 1 nm by changing the temperature of the QPM-LN crystal by 12° C., and the spectral phase was obtained as before.

EXAMPLE 3

In the present example 3, the second second-order nonlinear medium 113 in the foregoing example 2 was also replaced by a QPM-LN crystal. This served to further improve the sensitivity. In addition, the half-wave plate added in the example 2 was removed. To achieve enough bandwidth for measuring the 10 fs wide pulses, a 0.25 mm long QPM-LN crystal was used as the second-stage second-order nonlinear medium 113, in which case a bandwidth of 87 THz was expected from the foregoing equation (11). Since the walk-off effect does not appear in the quasi phase matching crystal, the local oscillator light and optical signal to be measured were made coaxial, and were incident and focused through a 5 mm focal length lens. In this case, the mixing coefficient reached as high as 0.54 for the pump light. As a result, it was possible to handle the optical signal to be measured with less power. For example, the optical signal to be measured with average power of 3.7 mW brought about the mixing coefficient of 0.10, which enabled the easy measurement.

EXAMPLE 4

The present example 4 tried to further improve the sensitivity by adding an optical amplifier to the foregoing example 3. Specifically, a high output power GaAlAs semiconductor laser amplifier was interposed as the optical amplifier 104. The saturation output power of the optical amplifier 104 was 200 mW, and to make effective use thereof, the spectral bandwidth of the input to the amplifier was preferably limited by providing the optical filter 103 before the amplifier. Here, a 1 nm wide tunable filter was used as the optical filter 103. Using the optical amplifier 104 allowed the beam splitter 102 with a splitting close to one to be applied. In this case, the beam splitter 102 was used that reflected 20% of the optical signal to be measured 101 onto the reflector 109. When the average input power was 0.1 mW, the average output power of the optical filter 103 was about 2 $\mu$W, and it was amplified by the optical amplifier 104 to 5 mW. The output of the optical amplifier 104 was incident and focused onto the 1 mm long QPM-LN crystal through a 10 mm focal length lens. As a result, the local oscillator light of 0.2 mW was generated and the mixing coefficient was 0.11, enabling very easy measurement. To vary the wavelength of the local oscillator light, the transmission wavelength of the optical filter 103 was shifted by 2 nm in conjunction with the temperature adjustment described above. The output of the optical amplifier 104 was able to be kept fixed for such slight wavelength variations.

EXAMPLE 5

The present example 5 is capable of implementing the same resolution for a longer wavelength optical signal using a longer crystal. It will be described by way of example corresponding to the foregoing example 3 applied to the 1.5 $\mu$m wavelength region. A Cr:YAG laser is known as a femtosecond light source for that wavelength region. As the first second-order nonlinear medium 105, a QPM-LN crystal was used which was made wavelength tunable by setting the angle of incidence at 24 degrees with respect to the direction of the wave number of the periodic structure of the crystal that was subjected to 16.9 $\mu$m domain inversion. The crystal length was made 8 mm, and the launching and focusing was achieved by a 50 mm focal length lens. The optical signal to be measured 101 consisting of a 50 fs pulse train with a repetition frequency of 200 MHz, average power of 50 mW and center frequency of 1.53 $\mu$m was able to generate the local oscillator light with average power of 3 mW and a spectral width of 0.7 nm (0.4 THz). The peak power of the local oscillator light was estimated to be 12 W. A silica glass substrate with a one degree wedge was used as the phase controller 112. The sliding amount for one period was 4.52 mm. The same kind of the tunable QPM-LN crystal of 1 mm thick was used as the second second-order nonlinear medium 113. In this case, a bandwidth of 78.8 THz was expected from the foregoing equation (11). Onto such a crystal, the light was incident and focused using a 10 mm focal length lens, resulting in very easy measurement with the mixing coefficient of 0.27. The wavelength of the local oscillator light was varied by 2 nm by changing the temperature of the QPM-LN crystal by 36° C., and the spectral phase was obtained at the frequency step of 0.5 THz.

EXAMPLE 6

The present example 6 tried to further improve the sensitivity by adding an optical amplifier to the foregoing example 5. Specifically, a high output power GaAlAs semiconductor laser amplifier was interposed as the optical amplifier 107. When the average input power of the optical signal to be measured 101 was 0.7 mW, the average output power of the second harmonic light generated by the second-order nonlinear medium 105 was about 1 $\mu$W, and it was amplified by the optical amplifier 107 up to 2 mW. By using the output of the optical amplifier 107 as the local oscillator light, the measurement was easily carried out with the mixing coefficient of 0.22. The output of the optical amplifier 107 was able to be kept fixed for the wavelength variations of about 2 nm in the local oscillator light.

EXAMPLE 7

The present example 7 tried to improve the sensitivity by replacing the two QPM-LN crystals in the foregoing example 5 with QPM-LN crystals that had a waveguide structure. More specifically, the first second-order nonlinear medium 105 and the second second-order nonlinear medium 113 were each replaced by a QPM-LN crystal which bore an 18.4 $\mu$m period domain inversion, and into which a waveguide structure with a cross-section of 3×5$\mu$m was embedded. The first second-order nonlinear medium 105 had a crystal length of 8 mm, and for launching and focusing onto the crystal, a ×20 objective lens was used, in which case a coupling efficiency of 30% was achieved. When the average power of the optical signal to be measured 101 was 5 mW, the average power of the generated second harmonic light was 1.0 mW. The second second-order nonlinear medium 113 had a crystal thickness of 1 mm, and used the same incident condition as the above. In this case, the mixing coefficient was 0.22, which granted an easy measurement. The wavelength of the local oscillator light was varied by changing the temperature of the first QPM-LN crystal as before.

EXAMPLE 8

The present example 8 used the foregoing examples 6 and 7 in combination to enable the measurement of a semiconductor laser pulse train. A pulse train with a repetition frequency of 20 GHz, average power of 1 mW and a center wavelength of 1.55 µm, which was output from a mode-locked semiconductor laser, was used as the optical signal to be measured 101. The beam splitter 102 used here reflected 10% of the optical signal to be measured 101 toward the reflector 109. As the first second-order nonlinear medium 105 and the second second-order nonlinear medium 113 were used a QPM-LN crystal which bore a 19.0 µm period domain inversion, and into which a waveguide structure with the same structure as before was embedded. The semiconductor laser pulses, having a wide pulse width and hence narrow spectral width, required measurement at a high wavelength resolution. Accordingly, the first-stage crystal length was set as long as available, at 20 mm.

The average power of the generated second harmonic light was 4.0 µW, and its spectral width was 0.30 nm (0.15 THz). The spectral width was further narrowed using the optical filter 106 consisting of a 0.05 nm wide tunable filter. The output power of the tunable filter was about 0.5 µW, which was amplified to 1 mW by the optical amplifier 107. The local oscillator light was almost cw (continuous wave) light, and its peak power was estimated at about 1 mW. The crystal length of the second-stage second-order nonlinear medium 113 was also made 20 mm, from which a bandwidth of 19.8 THz was expected from the foregoing equation (11). The bandwidth enabled the measurement up to 50 fs pulses, an ample temporal resolution for measuring the existing semiconductor laser pulses. In this case, the measurement was carried out with the mixing coefficient 0.07. The wavelength of the local oscillator light was varied by 0.08 nm by adjusting the optical filter 106, and the spectral phases were obtained at the 0.02 THz frequency steps. Although the temperature of the two QPM-LN crystals was able to be changed by 1.5° C. to tune phase matching in a way linked to the optical filter 106, this was not necessary in this case. This was because the bandwidth of the first-stage crystal was still rather wide as compared with that of the optical filter 106. The frequency step is equal to the longitudinal mode spacing of the semiconductor laser pulses. In other words, the spectral phase was measured for each longitudinal mode.

EXAMPLE 9

The present example 9 made it possible to measure a weaker optical signal by interposing the optical amplifier 104 before the second-order nonlinear medium 105 in the foregoing example 8. An ordinary GaInAsP semiconductor laser amplifier was interposed as the optical amplifier 104. In this case, a gain of 30 dB enabled the measurement with the same mixing coefficient even for the optical signal to be measured 101 whose average power is attenuated to 1 µW. Thus, the waveforms of optical signals were able to be measured in nearly the same feeling as conducting the current spectral measurement.

EXAMPLE 10

As described before, when carrying out the embodiment 2 in accordance with the present invention using the optical fiber as the third-order nonlinear medium 214, it is preferable to measure the optical signal near the zero-dispersion wavelength of the optical fiber. Accordingly, the setup of the foregoing embodiment 2 is effective in the 1.3 µm or 1.5 µm band. In view of this, the present example 10 was devised for a femtosecond light source in the 1.5 µm wavelength region. In the present example 10, a Cr:YAG laser was employed as in the foregoing example 5, so that a 50 fs pulse train with the repetition frequency of 200 MHz, average power of 50 mW and center wavelength of 1.53 µm, was used as the optical signal to be measured 201. The beam splitter 202 reflected 1% of the optical signal to be measured 201 toward the reflector 209, and the remaining 99% was incident onto the optical filter 203 consisting of a 1 nm wide tunable filter with the center wavelength of 1.548 µm. The average output power of the optical filter 203 was 0.5 mW. The following optical amplifier 204, consisting of a GaInAsP semiconductor laser amplifier, produced the local oscillator light with the average power of 2.5 mW. The peak power of the local oscillator light was estimated at 4 W.

Although the center wavelength of the local oscillator light, that is, the degenerate wavelength, deviated from the center wavelength of the optical signal to be measured, this did not hinder the measurement because the spectral width of the 50 fs pulse was as wide as 60 nm. The degenerate wavelength was chosen so that the subsequent third-order nonlinear medium 214 had a wide bandwidth. As the phase controller 212, a combination of a ⅛ wave plate and a quarter-wave plate was used. As the third-order nonlinear medium 214, a common standard dispersion-shifted optical fiber was used with a zero-dispersion wavelength of 1.550 µm and a dispersion slope of 0.07 ps/km/nm². The length of the optical fiber was selected to 10 m, in which case the bandwidth of 19.0 THz was expected from the foregoing equation (11), which was sufficient for the 50 fs pulse measurement.

With the foregoing setup, the mixing coefficient of 0.10 was observed on the mixed spectrum, enabling the interference phase observation. The spectral phases were obtained at the frequency step of 0.5 THz by changing the wavelength of the local oscillator light to 1.552 µm by adjusting the optical filter 203. The GaInAsP semiconductor laser amplifier was operated at a very low gain. It was easy to increase the gain up to 37 dB, in which case the measurement with the same mixing gain was possible even if the average power of the optical signal to be measured 201 was attenuated to 50 µW.

EXAMPLE 11

The present example 11 applied the foregoing embodiment 2 to the measurement of a semiconductor laser pulse train. More specifically, as in the foregoing example 8, a 1 ps pulse train with a repetition frequency of 20 GHz, average power of 1 mW and a center wavelength of 1.55 µm, which was output from a mode-locked semiconductor laser, was used as the optical signal to be measured 201. The beam splitter 202 used here reflected 10% of the optical signal to be measured 201 toward the reflector 209. As the optical filter 203, a 0.1 nm wide tunable filter was used, and its output power was 25 µW. A tandem of a GaInAsP semiconductor laser amplifier and an Er (erbium) fiber amplifier was used as the optical amplifier 104.

The former amplified the power up to 2.5 mW and the latter up to 200 mW. The local oscillator light was nearly cw light, and its peak power was estimated at about 200 mW. As the third-order nonlinear medium 214, a standard dispersion-shifted optical fiber was used as in the previous example 10. The length of the optical fiber was selected at 100 m, which was expected from the foregoing equation (11) to provide a bandwidth of 1.93 THz at the worst in the 1.53 µm to 1.57 µm region. It was the bandwidth that enabled the measurement up to 0.5 ps pulses. The measurement was carried out with the mixing coefficient of 0.05. It was possible to change the wavelength of the local oscillator light by 0.16 nm, and thus to obtain the spectral phases at the frequency step of 0.02 THz. In other words, the spectral phases were measured for each longitudinal mode.

Increasing the gain of the GaInAsP semiconductor laser amplifier to 40 dB enabled the measurement to be performed using the same mixing coefficient for the optical signal to be measured 201 with an average power of 100 μW.

EXAMPLE 12

The present example 12 used a pulse train generated by a Cr:YAG laser as the optical signal to be measured as in the foregoing example 5. As the second-order nonlinear medium 305, a QPM-LN crystal was used which was made wavelength variable by setting the angle of incidence at 24 degrees with respect to the direction of the wave number of the periodic structure of the crystal that was subject to the 16.9 μm period domain inversion. The crystal length was set at 8 mm, and the incidence and focusing was achieved by a 50 mm focal length lens. The optical signal to be measured consisting of a 50 fs pulse train with a repetition frequency of 200 MHz, average power of 50 mW and center wavelength of 1.53 μm was able to generate the local oscillator light with average power of 0.4 mW and a spectral width of 0.7 nm (0.4 THz). The peak power of the local oscillator light was estimated at 1.7 W. The same type of the wavelength variable QPM-LN crystal of 2 mm thick was used as the second-stage second-order nonlinear medium 313. In this case, a phase matching bandwidth of 55.7 THz was expected, which is an ample width for measuring the 50 fs optical signal. The light was incident and focused onto the second-stage second-order nonlinear medium 313 using a lens with a 20 mm focal length, resulting in a mixed spectrum with the mixing coefficient m=0.10. A 10 mm long stacked piezoelectric actuator was used as the translator 312. A 25 cm Zerny-Turner monochromator with a wavelength resolution of 2 angstroms was used for each of the monochromator 316 and monochromator 318, on which the InGaAs photo-detector 317 and photo-detector 319 were mounted, respectively. The output voltages of the photo-detectors were observed and recorded through an AC coupling.

The reference optical frequency $v_r$ was selected at 195.95 THz, and the monochromator 318 was set at the corresponding wavelength of 1530 nm. The reference optical frequency $v_r$ was set at around the center of the spectrum of the input optical signal to be measured. Subsequently, with setting the monochromator 316 at the optical frequency $v$ at which the interference phase was to be measured, the translator 312 was driven by a ramp (linear slope) voltage with an amplitude of −70 V and duration of 300 ms. Then, the output voltages of the photo-detector 319 and photo-detector 317 were measured and recorded at 512 points in time series fashion during the backward movement of the reflector 309 at nearly the constant speed.

Figure 12A:
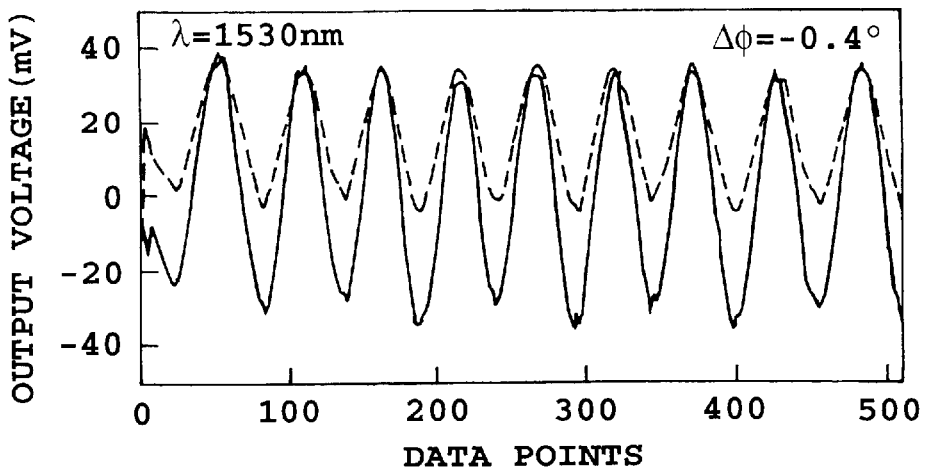
Figure 12B:
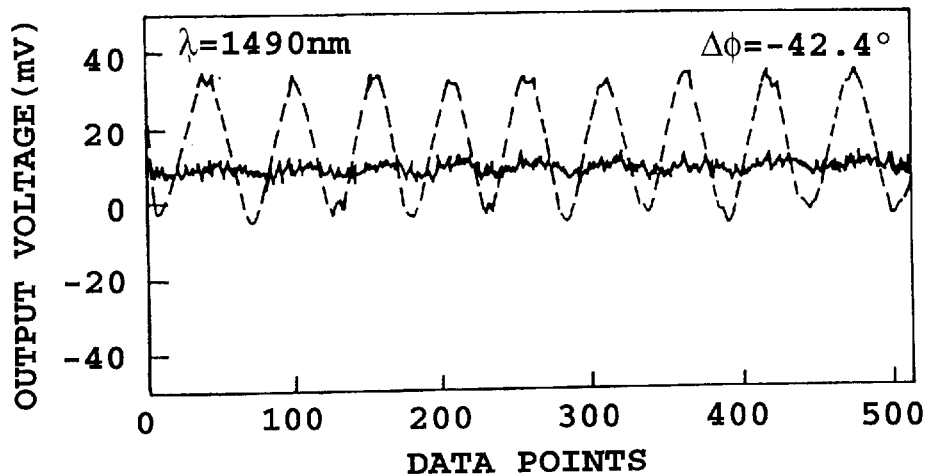
Figure 12C:
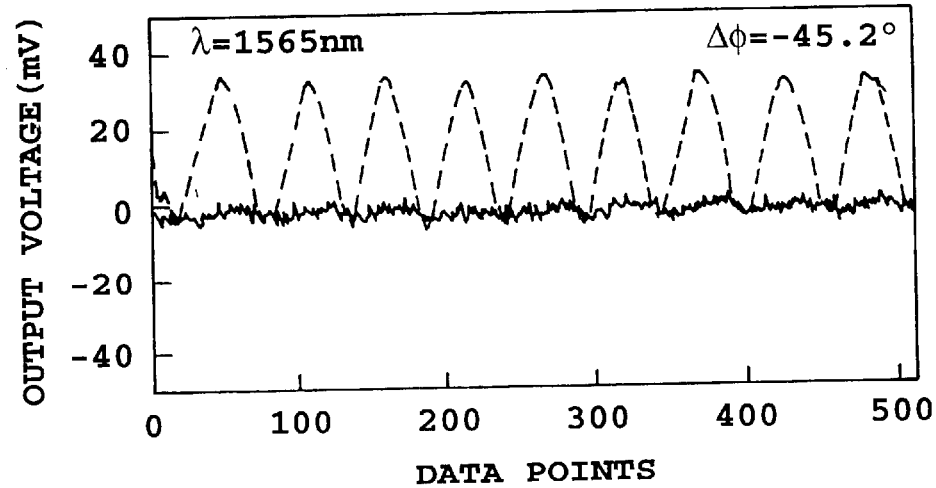
Figure 13A:
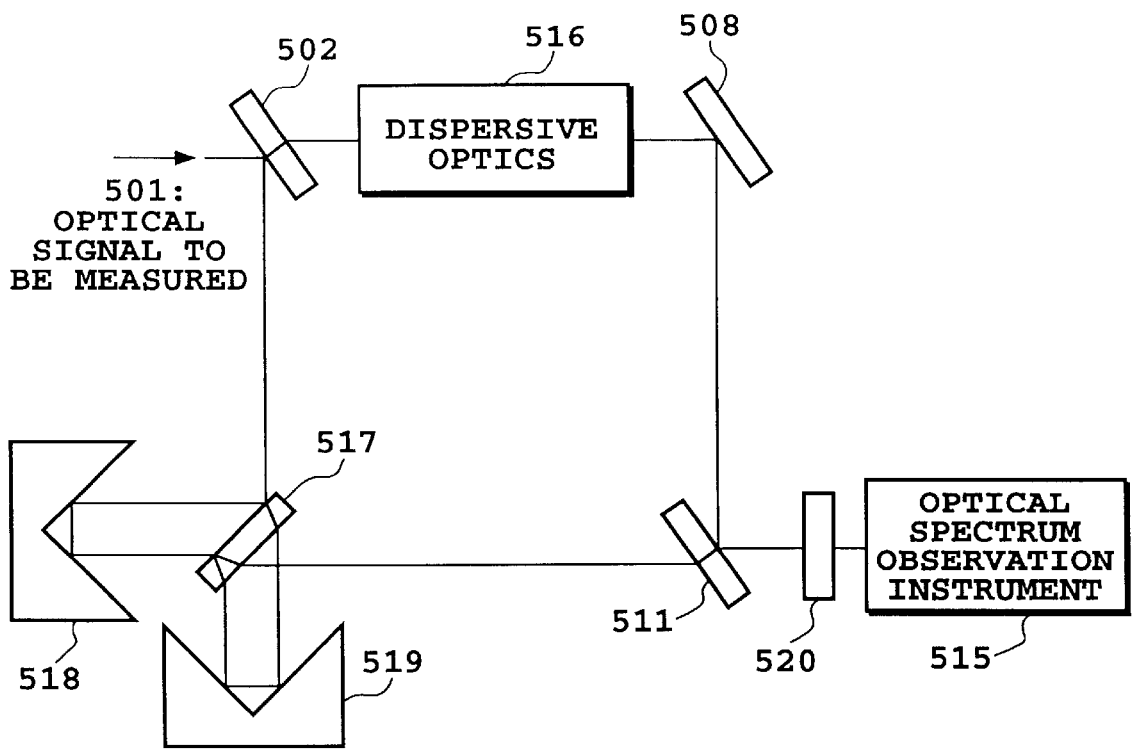
FIGS. 13A and 13B illustrate a conventional method for measuring a temporal waveform of the electric field of an optical signal.
Figure 13B:
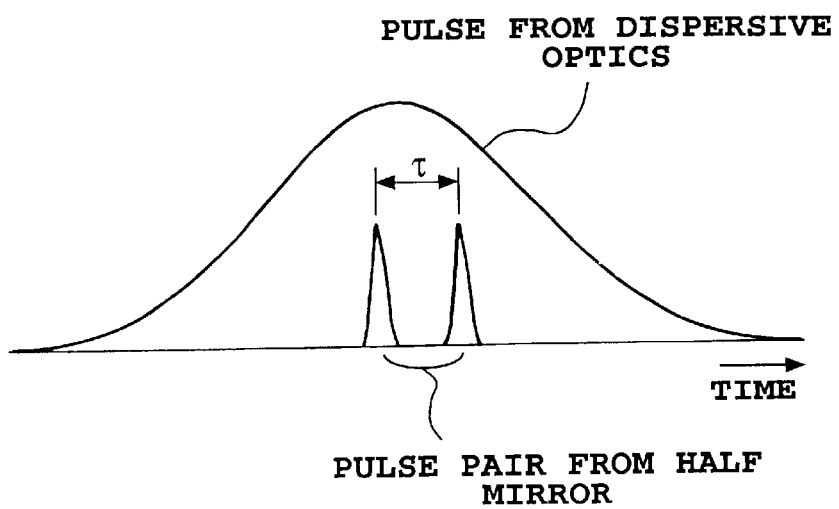

FIGS. 12A–12C, which show phase difference calculation examples in accordance with the present invention, illustrate examples of the time series data thus obtained. In these figures, broken lines denote the spectral output time series data $V(v_r)$ at the reference optical frequency $v_r$ supplied from the photo-detector 319, and solid lines denote the spectral output time series data $V(v)$ at the measurement optical frequency $v$ supplied from the photo-detector 317.

FIG. 12A illustrates the data when the wavelength of the monochromator 316 was set at 1530 nm. By a glance, it will be seen that the interference oscillations appearing in the data $V(v_r)$ and $V(v)$ are inphase. This was proved by the resultant phase difference of −0.4 degree obtained by performing the above-described phase difference calculation procedure on the data. The phase difference calculation was executed in about 0.1 second by a small computer including a Pentium processor with a clock frequency of 70 MHz, which was a sufficient speed required.

Although the output voltages were AC coupled, a considerable amount of DC component was superimposed on the time series data $V(v_r)$ because of a nonnegligible DC offset of the subsequent amplifiers. In spite of this, the phase difference calculation was achieved correctly. This proves that the DC component elimination operation in the calculation procedure functions effectively.

FIG. 12B illustrates data obtained by shifting the wavelength of the monochromator 316 to a shorter side, to 1490 nm. In this case, the oscillation amplitude of the $V(v)$ was decreased because of the reduction in the spectral intensity at the wing of the spectrum of the input light to be measured. In this figure, the interference oscillation of the $V(v)$ lagged behind the $V(v_r)$, which agreed with the reading of −42.4 degrees obtained as the result of the phase difference calculation.

FIG. 12C illustrates data obtained by shifting the wavelength of the monochromator 316 to a longer side, to 1565 nm. As for the interference oscillation of the data $V(v)$ lagged behind the data $V(v_r)$, the result of the phase difference calculation was −45.2 degrees. The interference phase measurement was able to be achieved by iterating the foregoing measurement.

Furthermore, the interference phases were measured again with changing the temperature of the QPM-LN crystal by 36° C. and varying the wavelength of the local oscillator light by 2 nm. The spectral phase were obtained at the frequency steps of 0.5 THz by combining these conditions.

EXAMPLE 13

In the present example 13, the spectrograph 320 and linear detector array 321 were used for the mixed spectrum detection in the foregoing example 12. As the spectrograph 320, was used a 12 cm Zerny-Turner spectrograph comprising a diffraction grating with slits of 600/mm, and as the linear detector array 321, was used an InGaAs linear detector array with the number of pixels of 256 and pixel spacing of 50 μm. In this case, the resolution of the spectrograph 320 was 13 nm/mm, making it possible to observe and record the 166 nm wide mixed spectra at 6.5 angstrom intervals at a time.

In the present example 13, the translator 312 was driven by a ramp (linear slope) voltage with an amplitude of −70 V and duration of 524.3 ms. Then, while the reflector 309 was moving backward at nearly the constant speed, the outputs of the linear detector array 321 were read out and recorded at a read-out time of 1024 μs per reading. Thus, 256×512 points were recorded as two-dimensional data.

From the two-dimensional data thus obtained, an output time series near the center of the spectrum of the input light to be measured was selected as the $V(v_r)$. Then, at an interval of every three pixels, the output time series of the remaining pixels were given to the phase difference calculation procedure to calculate the interference phases. The total time needed for the calculation was about seven seconds using the above-mentioned small computer. Using the faster computer can naturally shorten the computing time. Thus, the interference phases needed for all the spectra were able to be obtained in a slightly over seven seconds, that is, the total calculation time plus the data acquisition time of 0.5 second, which enabled quick measurement.

Furthermore, the interference phases were measured again with changing the temperature of the front stage QPM-LN crystal by 35° C. and the wavelength of the local oscillator light by 1.95 nm. In this case, it was preferable that the variation in the wavelength of the local oscillator light be set at an integer multiple of the wavelength spacing between the pixels determined by the combination of the spectrograph 320 and the linear detector array 321. It was set at three times here, and hence it was enough to carry out the interference phase calculation at intervals of three pixels. Combining the foregoing, the spectral phases were obtained at the frequency steps of 0.5 THz. The total measurement time period was very short, less than 20 seconds.

Although the embodiments and examples in accordance with the present invention are described, the present invention is not limited to the foregoing embodiments and examples, but can be modified variously within the subject matter of the present invention.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for measuring a temporal waveform of the electric field of an optical signal comprising the steps of:
   generating phase conjugated light by applying local oscillator light to optical signal to be measured;
   generating mixed light by combining the optical signal to be measured with the phase conjugated light;
   obtaining a spectral phase by observing a spectrum of the mixed light; and
   obtaining a temporal waveform of the electric field of the optical signal to be measured by attaching the spectral phase to a separately observed spectrum of the optical signal to be measured.

2. The method for measuring a temporal waveform of the electric field of an optical signal as claimed in claim 1, further comprising the step of acquiring spectra of two mixed light waves which are associated with the local oscillator light having different wavelengths.

3. The method for measuring a temporal waveform of the electric field of an optical signal as claimed in claim 2, further comprising the step of carrying out for each spectrum of the mixed light waves multiple times of measurements with different fixed relative phases between the local oscillator light and the optical signal to be measured.

4. The method for measuring a temporal waveform of the electric field of an optical signal as claimed in claim 2, further comprising the step of comparing, for each wavelength of the local oscillator light, intensity changes in at least two spectral components in the mixed light resulting from changes in a relative phase between the local oscillator light and the optical signal to be measured, and the step of measuring a relative phase between the at least two spectral components using results of the step of comparing.

5. The method for measuring a temporal waveform of the electric field of an optical signal as claimed in claim 2, further comprising the steps of:
   splitting the optical signal to be measured;
   generating the local oscillator light by launching first optical signal to be measured onto a medium with a second-order optical nonlinear effect, the first optical signal to be measured being a first portion split; and
   generating the phase conjugated light by launching the generated local oscillator light and second optical signal to be measured onto another medium with a second-order optical nonlinear effect, the second optical signal to be measured being a second portion split.

6. The method for measuring a temporal waveform of the electric field of an optical signal as claimed in claim 2, further comprising the steps of:
   generating the local oscillator light by launching first optical signal to be measured onto an optical filter; and
   generating the phase conjugated light by launching the generated local oscillator light and second optical signal to be measured onto a medium with a third-order optical nonlinear effect.

7. The method for measuring a temporal waveform of the electric field of an optical signal as claimed in claim 2, further comprising the step of amplifying the local oscillator light.

8. The method for measuring a temporal waveform of the electric field of an optical signal as claimed in claim 1, further comprising the step of carrying out for each spectrum of the mixed light waves multiple times of measurements with different fixed relative phases between the local oscillator light and the optical signal to be measured.

9. The method for measuring a temporal waveform of the electric field of an optical signal as claimed in claim 8, further comprising the steps of:
   splitting the optical signal to be measured;
   generating the local oscillator light by launching first optical signal,to be measured onto a medium with a second-order optical nonlinear effect, the first optical signal to be measured being a first portion split; and
   generating the phase conjugated light by launching the generated local oscillator light and second optical signal to be measured onto another medium with a second-order optical nonlinear effect, the second optical signal to be measured being a second portion split.

10. The method for measuring a temporal waveform of the electric field of an optical signal as claimed in claim 8, further comprising the steps of:
    generating the local oscillator light by launching first optical signal to be measured onto an optical filter; and
    generating the phase conjugated light by launching the generated local oscillator light and second optical signal to be measured onto a medium with a third-order optical nonlinear effect.

11. The method for measuring a temporal waveform of the electric field of an optical signal as claimed in claim 8, further comprising the step of amplifying the local oscillator light.

12. The method for measuring a temporal waveform of the electric field of an optical signal as claimed in claim 1, further comprising the step of comparing, for each wavelength of the local oscillator light, intensity changes in at least two spectral components in the mixed light resulting from changes in a relative phase between the local oscillator light and the optical signal to be measured, and the step of measuring a relative phase between the at least two spectral components using results of the step of comparing.

13. The method for measuring a temporal waveform of the electric field of an optical signal as claimed in claim 12, further comprising the steps of:
    splitting the optical signal to be measured;
    generating the local oscillator light by launching first optical signal to be measured onto a medium with a second-order optical nonlinear effect, the first optical signal to be measured being a first portion split; and
    generating the phase conjugated light by launching the generated local oscillator light and second optical signal to be measured onto another medium with a second-order optical nonlinear effect, the second optical signal to be measured being a second portion split.

14. The method for measuring a temporal waveform of the electric field of an optical signal as claimed in claim 12, further comprising the steps of:

generating the local oscillator light by launching first optical signal to be measured onto an optical filter; and generating the phase conjugated light by launching the generated local oscillator light and second optical signal to be measured onto a medium with a third-order optical nonlinear effect.

15. The method for measuring a temporal waveform of the electric field of an optical signal as claimed in claim 12, further comprising the step of amplifying the local oscillator light.

16. The method for measuring a temporal waveform of the electric field of an optical signal as claimed in claim 12, wherein the step of comparing intensity changes in at least two spectral components resulting from the changes in the relative phase comprises the steps of:

changing the relative phase in a ramp (linear slope) fashion;

generating, for sinusoidal intensity changes obtained, a signal whose phase is shifted by 90 degrees from a spectral component adopted as a reference;

integrating a product of the intensity changes of the spectral component and intensity changes in another spectral component to obtain a first integral;

integrating a product of the intensity changes of the spectral component and the signal whose phase is shifted by 90 degrees to obtain a second integral; and obtaining the relative phase between the spectral components from a ratio of the two integrals.

17. The method for measuring a temporal waveform of the electric field of an optical signal as claimed in claim 16, further comprising the steps of:

splitting the optical signal to be measured;

generating the local oscillator light by launching first optical signal to be measured onto a medium with a second-order optical nonlinear effect, the first optical signal to be measured being a first portion split; and generating the phase conjugated light by launching the generated local oscillator light and second optical signal to be measured onto another medium with a second-order optical nonlinear effect, the second optical signal to be measured being a second portion split.

18. The method for measuring a temporal waveform of the electric field of an optical signal as claimed in claim 16, further comprising the steps of:

generating the local oscillator light by launching first optical signal to be measured onto an optical filter; and generating the phase conjugated light by launching the generated local oscillator light and second optical signal to be measured onto a medium with a third-order optical nonlinear effect.

19. The method for measuring a temporal waveform of the electric field of an optical signal as claimed in claim 16, further comprising the step of amplifying the local oscillator light.

20. The method for measuring a temporal waveform of the electric field of an optical signal as claimed in claim 16, wherein an integration interval of the integration is set at an integer multiple of a period of the intensity changes in the spectral component adopted as the reference.

21. The method for measuring a temporal waveform of the electric field of an optical signal as claimed in claim 20, further comprising the steps of:

splitting the optical signal to be measured;

generating the local oscillator light by launching first optical signal to be measured onto a medium with a second-order optical nonlinear effect, the first optical signal to be measured being a first portion split; and generating the phase conjugated light by launching the generated local oscillator light and second optical signal to be measured onto another medium with a second-order optical nonlinear effect, the second optical signal to be measured being a second portion split.

22. The method for measuring a temporal waveform of the electric field of an optical signal as claimed in claim 20, further comprising the steps of:

generating the local oscillator light by launching first optical signal to be measured onto an optical filter; and generating the phase conjugated light by launching the generated local oscillator light and second optical signal to be measured onto a medium with a third-order optical nonlinear effect.

23. The method for measuring a temporal waveform of the electric field of an optical signal as claimed in claim 20, further comprising the step of amplifying the local oscillator light.

24. The method for measuring a temporal waveform of the electric field of an optical signal as claimed in claim 1, further comprising the steps of:

splitting the optical signal to be measured;

generating the local oscillator light by launching first optical signal to be measured onto a medium with a second-order optical nonlinear effect, the first optical signal to be measured being a first portion split; and generating the phase conjugated light by launching the generated local oscillator light and second optical signal to be measured onto another medium with a second-order optical nonlinear effect, the second optical signal to be measured being a second portion split.

25. The method for measuring a temporal waveform of the electric field of an optical signal as claimed in claim 24, further comprising the step of amplifying the local oscillator light.

26. The method for measuring a temporal waveform of the electric field of an optical signal as claimed in claim 24, further comprising the step of limiting a spectral width of the local oscillator light by inserting an optical filter in at least one of two positions before and after the medium with the second-order optical nonlinear effect to which the first optical signal to be measured is incident.

27. The method for measuring a temporal waveform of the electric field of an optical signal as claimed in claim 26, further comprising the step of amplifying the local oscillator light.

28. The method for measuring a temporal waveform of the electric field of an optical signal as claimed in claim 24, further comprising the step of amplifying the light to be incident to the medium with the second-order optical nonlinear effect to which the first optical signal to be measured is incident, or amplifying, when the optical filter is interposed, the light which is output from the optical filter and is to be incident to the medium.

29. The method for measuring a temporal waveform of the electric field of an optical signal as claimed in claim 28, further comprising the step of amplifying the local oscillator light.

30. The method for measuring a temporal waveform of the electric field of an optical signal as claimed in claim 1, further comprising the steps of:

generating the local oscillator light by launching first optical signal to be measured onto an optical filter; and generating the phase conjugated light by launching the generated local oscillator light and second optical signal to be measured onto a medium with a third-order optical nonlinear effect.

31. The method for measuring a temporal waveform of the electric field of an optical signal as claimed in claim 30, further comprising the step of amplifying the local oscillator light.

32. The method for measuring a temporal waveform of the electric field of an optical signal as claimed in claim 1, further comprising the step of amplifying the local oscillator light.

33. An apparatus for measuring a temporal waveform of the electric field of an optical signal comprising:

local oscillator light generating means for generating local oscillator light from optical signal to be measured;

phase conjugated light generating means for generating phase conjugated light using the local oscillator light;

means for obtaining a spectral phase by observing a spectrum of mixed light generated by combining the optical signal to be measured with the phase conjugated light; and means for obtaining a temporal waveform of the electric field of the optical signal to be measured by attaching the spectral phase to a separately observed spectrum of the optical signal to be measured.

34. The apparatus for measuring a temporal waveform of the electric field of an optical signal as claimed in claim 33, further comprising means for acquiring spectra of two mixed light waves which are associated with the local oscillator light having different wavelengths.

35. The apparatus for measuring a temporal waveform of the electric field of an optical signal as claimed in claim 34, further comprising means for carrying out for each spectrum of the mixed light waves multiple times of measurements with different relative phases between the local oscillator light and the optical signal to be measured.

36. The apparatus for measuring a temporal waveform of the electric field of an optical signal as claimed in claim 34, further comprising:

means for simultaneously observing intensities of at least two spectral components in the mixed light;

means for changing a relative phase between the local oscillator light and the optical signal to be measured; and means for measuring a relative phase between the at least two spectral components by comparing intensity changes in the at least two spectral components resulting from the changes in the relative phase.

37. The apparatus for measuring a temporal waveform of the electric field of an optical signal as claimed in claim 34, further comprising a beam splitter for splitting the optical signal to be measured, wherein said local oscillator light generating means generates the local oscillator light by launching first optical signal to be measured onto a medium with a second-order optical nonlinear effect, the first optical signal to be measured being a first portion split by said beam splitter, and wherein said phase conjugated light generating means generates the phase conjugated light by launching the local oscillator light generated by said local oscillator light generating means and second optical signal to be measured onto another medium with a second-order optical nonlinear effect, the second optical signal to be measured being a second portion split by said beam splitter.

38. The apparatus for measuring a temporal waveform of the electric field of an optical signal as claimed in claim 34, wherein said local oscillator light generating means generates the local oscillator light by launching first optical signal to be measured onto an optical filter, and said phase conjugated light generating means generates the phase conjugated light by launching the local oscillator light generated by said local oscillator light generating means and second optical signal to be measured onto a medium with a third-order optical nonlinear effect.

39. The apparatus for measuring a temporal waveform of the electric field of an optical signal as claimed in claim 34, further comprising an optical amplifier for amplifying the local oscillator light.

40. The apparatus for measuring a temporal waveform of the electric field of an optical signal as claimed in claim 33, further comprising means for carrying out for each spectrum of the mixed light waves multiple times of measurements with different relative phases between the local oscillator light and the optical signal to be measured.

41. The apparatus for measuring a temporal waveform of the electric field of an optical signal as claimed in claim 40, further comprising a beam splitter for splitting the optical signal to be measured, wherein said local oscillator light generating means generates the local oscillator light by launching first optical signal to be measured onto a medium with a second-order optical nonlinear effect, the first optical signal to be measured being a first portion split by said beam splitter, and wherein said phase conjugated light generating means generates the phase conjugated light by launching the local oscillator light generated by said local oscillator light generating means and second optical signal to be measured onto another medium with a second-order optical nonlinear effect, the second optical signal to be measured being a second portion split by said beam splitter.

42. The apparatus for measuring a temporal waveform of the electric field of an optical signal as claimed in claim 40, wherein said local oscillator light generating means generates the local oscillator light by launching first optical signal to be measured onto an optical filter, and said phase conjugated light generating means generates the phase conjugated light by launching the local oscillator light generated by said local oscillator light generating means and second optical signal to be measured onto a medium with a third-order optical nonlinear effect.

43. The apparatus for measuring a temporal waveform of the electric field of an optical signal as claimed in claim 40, further comprising an optical amplifier for amplifying the local oscillator light.

44. The apparatus for measuring a temporal waveform of the electric field of an optical signal as claimed in claim 33, further comprising:

means for simultaneously observing intensities of at least two spectral components in the mixed light;

means for changing a relative phase between the local oscillator light and the optical signal to be measured; and means for measuring a relative phase between the at least two spectral components by comparing intensity changes in the at least two spectral components resulting from the changes in the relative phase.

45. The apparatus for measuring a temporal waveform of the electric field of an optical signal as claimed in claim 44, further comprising a beam splitter for splitting the optical signal to be measured, wherein said local oscillator light generating means generates the local oscillator light by launching first optical signal to be measured onto a medium with a second-order optical nonlinear effect, the first optical signal to be measured being a first portion split by said beam splitter, and wherein said phase conjugated light generating means generates the phase conjugated light by launching the local oscillator light generated by said local oscillator light generating means and second optical signal to be measured onto another medium with a second-order optical nonlinear effect, the second optical signal to be measured being a second portion split by said beam splitter.

46. The apparatus for measuring a temporal waveform of the electric field of an optical signal as claimed in claim 44, wherein said local oscillator light generating means generates the local oscillator light by launching first optical signal to be measured onto an optical filter, and said phase conjugated light generating means generates the phase conjugated light by launching the local oscillator light generated by said local oscillator light generating means and second optical signal to be measured onto a medium with a third-order optical nonlinear effect.

47. The apparatus for measuring a temporal waveform of the electric field of an optical signal as claimed in claim 44, further comprising an optical amplifier for amplifying the local oscillator light.

48. The apparatus for measuring a temporal waveform of the electric field of an optical signal as claimed in claim 44, wherein said means for simultaneously observing intensities of at least two spectral components comprises two monochromators, a photo-detector mounted on each of said monochromators, and a beam splitter for splitting the mixed light into two portions to be supplied to said two monochromators.

49. The apparatus for measuring a temporal waveform of the electric field of an optical signal as claimed in claim 48, further comprising a beam splitter for splitting the optical signal to be measured, wherein said local oscillator light generating means generates the local oscillator light by launching first optical signal to be measured onto a medium with a second-order optical nonlinear effect, the first optical signal to be measured being a first portion split by said beam splitter, and wherein said phase conjugated light generating means generates the phase conjugated light by launching the local oscillator light generated by said local oscillator light generating means and second optical signal to be measured onto another medium with a second-order optical nonlinear effect, the second optical signal to be measured being a second portion split by said beam splitter.

50. The apparatus for measuring a temporal waveform of the electric field of an optical signal as claimed in claim 48, wherein said local oscillator light generating means generates the local oscillator light by launching first optical signal to be measured onto an optical filter, and said phase conjugated light generating means generates the phase conjugated light by launching the local oscillator light generated by said local oscillator light generating means and second optical signal to be measured onto a medium with a third-order optical nonlinear effect.

51. The apparatus for measuring a temporal waveform of the electric field of an optical signal as claimed in claim 48, further comprising an optical amplifier for amplifying the local oscillator light.

52. The apparatus for measuring a temporal waveform of the electric field of an optical signal as claimed in claim 44, wherein said means for simultaneously observing intensities of at least two spectral components comprises a spectrograph equipped with a linear detector array.

53. The apparatus for measuring a temporal waveform of the electric field of an optical signal as claimed in claim 52, further comprising a beam splitter for splitting the optical signal to be measured, wherein said local oscillator light generating means generates the local oscillator light by launching first optical signal to be measured onto a medium with a second-order optical nonlinear effect, the first optical signal to be measured being a first portion split by said beam splitter, and wherein said phase conjugated light generating means generates the phase conjugated light by launching the local oscillator light generated by said local oscillator light generating means and second optical signal to be measured onto another medium with a second-order optical nonlinear effect, the second optical signal to be measured being a second portion split by said beam splitter.

54. The apparatus for measuring a temporal waveform of the electric field of an optical signal as claimed in claim 52, wherein said local oscillator light generating means generates the local oscillator light by launching first optical signal to be measured onto an optical filter, and said phase conjugated light generating means generates the phase conjugated light by launching the local oscillator light generated by said local oscillator light generating means and second optical signal to be measured onto a medium with a third-order optical nonlinear effect.

55. The apparatus for measuring a temporal waveform of the electric field of an optical signal as claimed in claim 52, further comprising an optical amplifier for amplifying the local oscillator light.

56. The apparatus for measuring a temporal waveform of the electric field of an optical signal as claimed in claim 33, further comprising a beam splitter for splitting the optical signal to be measured, wherein said local oscillator light generating means generates the local oscillator light by launching first optical signal to be measured onto a medium with a second-order optical nonlinear effect, the first optical signal to be measured being a first portion split by said beam splitter, and wherein said phase conjugated light generating means generates the phase conjugated light by launching the local oscillator light generated by said local oscillator light generating means and second optical signal to be measured onto another medium with a second-order optical nonlinear effect, the second optical signal to be measured being a second portion split by said beam splitter.

57. The apparatus for measuring a temporal waveform of the electric field of an optical signal as claimed in claim 56, further comprising an optical amplifier for amplifying the local oscillator light.

58. The apparatus for measuring a temporal waveform of the electric field of an optical signal as claimed in claim 56, further comprising an optical filter inserted in at least one of two positions before and after the medium with the second-order optical nonlinear effect to which the first optical signal to be measured is incident, said optical filter being deployed for limiting a spectral width of the local oscillator light.

59. The apparatus for measuring a temporal waveform of the electric field of an optical signal as claimed in claim 58, further comprising an optical amplifier for amplifying the local oscillator light.

60. The apparatus for measuring a temporal waveform of the electric field of an optical signal as claimed in claim 56, further comprising an optical amplifier inserted before the medium with the second-order optical nonlinear effect to which the first optical signal to be measured is incident, or between the optical filter and said medium when said optical filter is interposed.

61. The apparatus for measuring a temporal waveform of the electric field of an optical signal as claimed in claim 60, further comprising an optical amplifier for amplifying the local oscillator light.

62. The apparatus for measuring a temporal waveform of the electric field of an optical signal as claimed in claim 33, wherein said local oscillator light generating means generates the local oscillator light by launching first optical signal to be measured onto an optical filter, and said phase conjugated light generating means generates the phase conjugated light by launching the local oscillator light generated by said local oscillator light generating means and second optical signal to be measured onto a medium with a third-order optical nonlinear effect.

63. The apparatus for measuring a temporal waveform of the electric field of an optical signal as claimed in claim 62, further comprising an optical amplifier for amplifying the local oscillator light.

64. The apparatus for measuring a temporal waveform of the electric field of an optical signal as claimed in claim 33, further comprising an optical amplifier for amplifying the local oscillator light.

\* \* \* \* \*